United States Patent [19]

Stone et al.

[11] Patent Number: 4,786,124
[45] Date of Patent: Nov. 22, 1988

[54] BROAD-SPECTRUM ACHROMATIC PHASE SHIFTERS, PHASE MODULATORS, FREQUENCY SHIFTERS, AND FREQUENCY MODULATORS

[75] Inventors: Thomas W. Stone, Rochester; Nicholas George, Pittsford, both of N.Y.

[73] Assignee: University of Rochester, Rochester, N.Y.

[21] Appl. No.: 43,124

[22] Filed: Apr. 27, 1987

[51] Int. Cl.$^4$ .......................... G02B 5/32; G02B 5/18; G02F 1/11; G01B 9/02
[52] U.S. Cl. ................ 350/3.7; 350/162.17; 350/162.24; 350/358; 356/345
[58] Field of Search ............ 350/162.17, 162.24, 350/358, 162.15, 168, 3.7; 356/345

[56] References Cited

U.S. PATENT DOCUMENTS 3,646,470 2/1972 Tsang .................................. 331/94.5
4,091,281 5/1978 Willhelm ........................ 350/162.17

OTHER PUBLICATIONS

N. George & S. Wang, "Cosinusoidal Transforms in White Light", *Applied Optics*, vol. 23, p. 787, Mar. 15, 1984.
H. Kogelnik, "Reconstructing Response & Efficiency of Hologram Gratings," Proc. Symp. Modern Optics, Polytechnic Institute of Brooklyn, 1967, p. 605.
N. George & J. W. Matthews, "Holograph Diffraction Gratings", Applied Physics Letters, 9, 212 (1966).
R. V. Johnson & A. R. Tanguay, *Optical Engineering*, Feb. 1986, vol. 25, 2, 235, *"Optical Beam Propagation Method for Birefringent Phase Grating Diffraction".
A. R. Tanguay & R. V. Johnson, J. Opt: Soc. of America A, Optics & Image Science, vol. 3, 13, p. 53 (Dec. 1986).
S. H. Lee, "Coherent Optical Processing" *Optical Information Processing Fundamentals* publisher Springer-Verlag, 1981.

Primary Examiner—Arnold Bruce Y.
Attorney, Agent, or Firm—Martin LuKacher

[57] ABSTRACT

Achromatic optical systems forming phase shifters and phase modulators are presented and shown to impart (temporal) phase-angle shifts in incoming waves which are independent of wavelength over extremely broad spectral ranges (achromatic or white light). Three major classes of achromatic phase shifters are described including the triangle, close cascade, and imaged grating configurations. When constructed utilizing volume holographic optical elements, very high diffraction efficiencies may be achieved over the large bandwidths used. These systems may similarly be utilized to impart achromatic frequency shifts and frequency modulations which are wavelength independent over extreme spectral ranges and usually do not disturb the spatial form of the input waves. These devices may be used in AC interferometers and allow such interferometers to be operated with white light. The devices are also useful in switching between spatial sine and cosine optical transforms in optical pattern recognition systems.

36 Claims, 18 Drawing Sheets

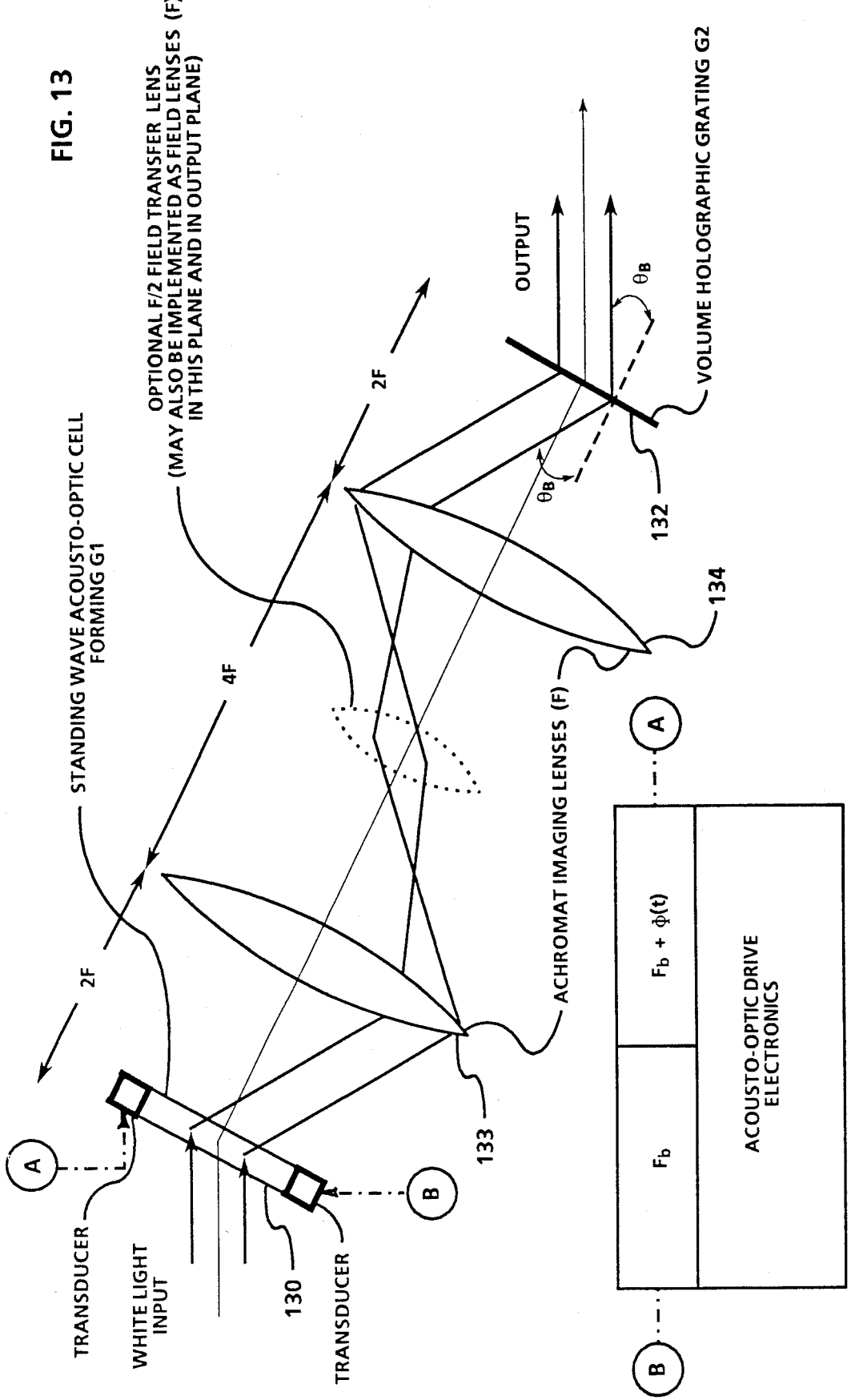

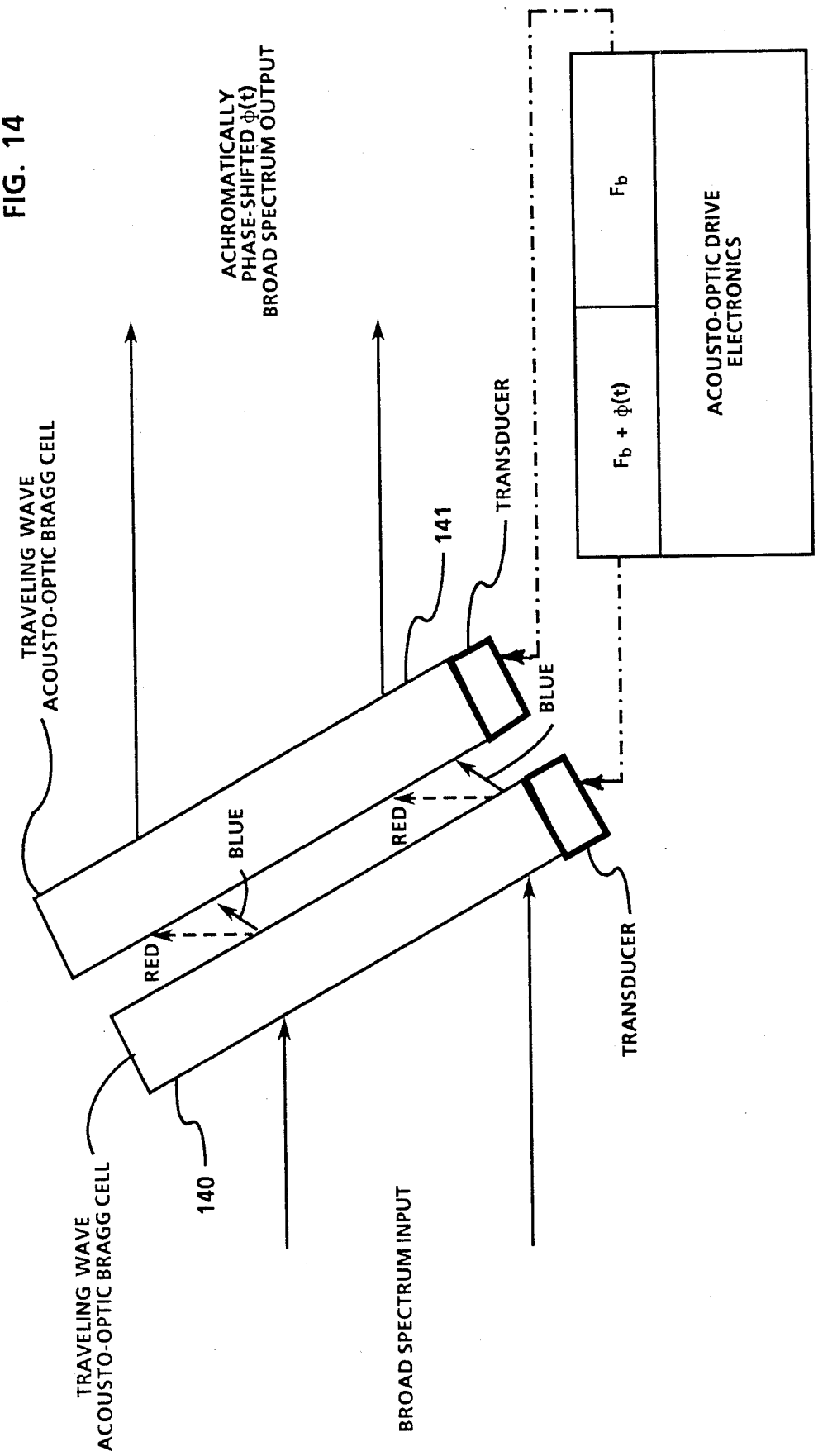

BROAD-SPECTRUM ACHROMATIC PHASE SHIFTERS, PHASE MODULATORS, FREQUENCY SHIFTERS, AND FREQUENCY MODULATORS

This invention was made with Government support under Grant AFOSR-84-0018 or 82-0336 awarded by the Air Force. The Government has certain rights in this invention.

DESCRIPTION

The present invention relates to optical devices and systems which utilize diffraction elements, preferably volume holographic elements, to introduce wavelength independent shifts in, or modulation of, the phase of incident broad-spectrum light. These devices and systems may also be used to introduce wavelength independent shifts in, or modulation of, the frequency of a beam of incident broad-spectrum light and can be arranged to operate without dispersing the output beam.

The invention is suitable for use in a number of devices which rely upon phase or time-varying phase modulation of light and extends the operation of such devices to use with white light instead of merely with coherent or single wavelength light. For example, the devices provided by the invention may be used in AC interferometers. The devices may also be used in pattern recognition systems wherein spatial sine and cosine optical transforms are needed. Such systems are described in an article by N. George and S. Wang, "Cosinusoidal Transforms in White Light", Applied Optics Vol. 23, page 787, March 15, 1984. The devices may be used between each of the corner reflectors and the beam splitter corner cube to switch between spatial sine and cosine transforms. The corner cubes and beam splitters are illustrated in FIG. 3 of the George and Wang article. Other applications for devices and systems in accordance with the invention may be found in optical information processing.

Phase shifting in optical systems has heretofore been accomplished principally by moving mirrors, corner reflectors and the like. A certain displacement however, provides a given phase shift only for one wavelength of light. Each wavelength in broad spectrum light, then is phase shifted by a different amount. Accordingly, such phase shifters have been used with coherent, laser light.

It has been discovered in accordance with the present invention that the same phase shift of each wavelength over an extremely broad spectral range can be obtained by a linear translation of a diffraction element. It has also been discovered that by using a plurality of the diffraction elements in cascade that a broad spectrum beam of light to which phase shift is applied by the movement of at least one of these elements with respect to the other can be recombined into an undispersed beam. By continuously varying the phase shift, for example in a sinusoidal manner, a carrier component can be applied to a broad spectrum optical signal using devices in accordance with the invention. Then, when such signals are detected they may be amplified and synchronously detected, e.g. with optical mixing. The displacements of the diffraction element may be obtained mechanically or electromechanically with actuators or electroacoustically by establishing the lines of a grating which provide the diffraction element in an electroacoustically activated cell.

By utilizing volume holographic elements as the diffraction elements high efficiency of transmission can be obtained while phase and frequency shifts and modulation are applied to the beam which passes through such elements. The acoustoptically driven configuration may also be in the form of a surface wave device where the grating lines are established by a surface acoustic wave on a substrate driven by a transducer formed on the substrate.

Accordingly, it is the principal object of the present invention to provide improved optical phase shifters, phase modulators, frequency shifters and frequency modulators which are achromatic devices and operate to provide phase or frequency shifts in like amounts to all wavelengths over a broad spectrum of light.

It is a further object of the present invention to provide improved systems of diffraction elements, preferably volume holographic elements which may be used to introduce wavelength independent shifts in, or modulation of, the frequency of a beam of incident broad spectrum light and can be arranged to operate without angularly or spatially dispersing the output beam of light.

It is a still further object of the present invention to provide improved devices for introducing wavelength independent shifts in, or time-varying modulation of, the phase of incident broad spectrum light through the use of volume holographic elements which transmit such light with high efficiency.

Briefly described, the invention accomplishes phase shift or phase modulation by the linear translation of a diffraction element transversely to the path of an input optical beam (e.g. perpendicularly to the grating lines or loci of constant modulation). The amount of temporal phase lag or lead is varied by displacing the diffraction element. Each wavelength exhibits a like amount of phase lag. Thus, the broad spectrum of wavelengths are phase shifted by like amounts corresponding to the displacement of the grating. Through the use of another grating in cascade, the individual wavelengths of the beam can be recombined into an output beam. Both the input and output beams are spectrally broad (e.g. white light) and the device is achromatic in operation, i.e., the phase lag is independent of wavelength. In other words, phase shift is dependent on, and can be linearly related to, displacement of the diffraction element. Through the use of volume holographic elements disposed at angles to the beam for efficient transmission, high efficiency of transmission is obtained while imposing desired phase shift of the beam. The beam can be phase modulated by translating the diffraction element in accordance with a modulation signal. Frequency modulation can be obtained by varying the rate at which the phase shift is imposed. In other words, by frequency modulation as used herein is meant temporal phase modulation of the optical signal.

The achromatic devices in accordance with the invention may be constructed in three major classes of configurations all of which provide phase shift, phase modulation or frequency modulation without dispersing the output beam. These are the triangle, closed cascade, and imaged grating configurations which may be extended or compounded for specific applications. In each of these configurations the diffraction elements are arranged in different ways.

The foregoing and other objects features and advantages of the invention will become more apparent from a reading of the following description in connection with the accompanying drawings which show devices in the major classes of configurations mentioned above

BRIEF DESCRIPTION OF THE DRAWINGS

FIG. 13 is a schematic diagram of an imaged grating configuration which may use a standing wave acousto-optic grating and an arrangement of lenses which enables the device to be cascaded with other devices in order to vary the phase shift in successive stages; and FIG. 14 is a schematic diagram of an electronically tuned achromatic phase shifter in a closed cascade configuration.

DETAILED DESCRIPTION

Figure 1:
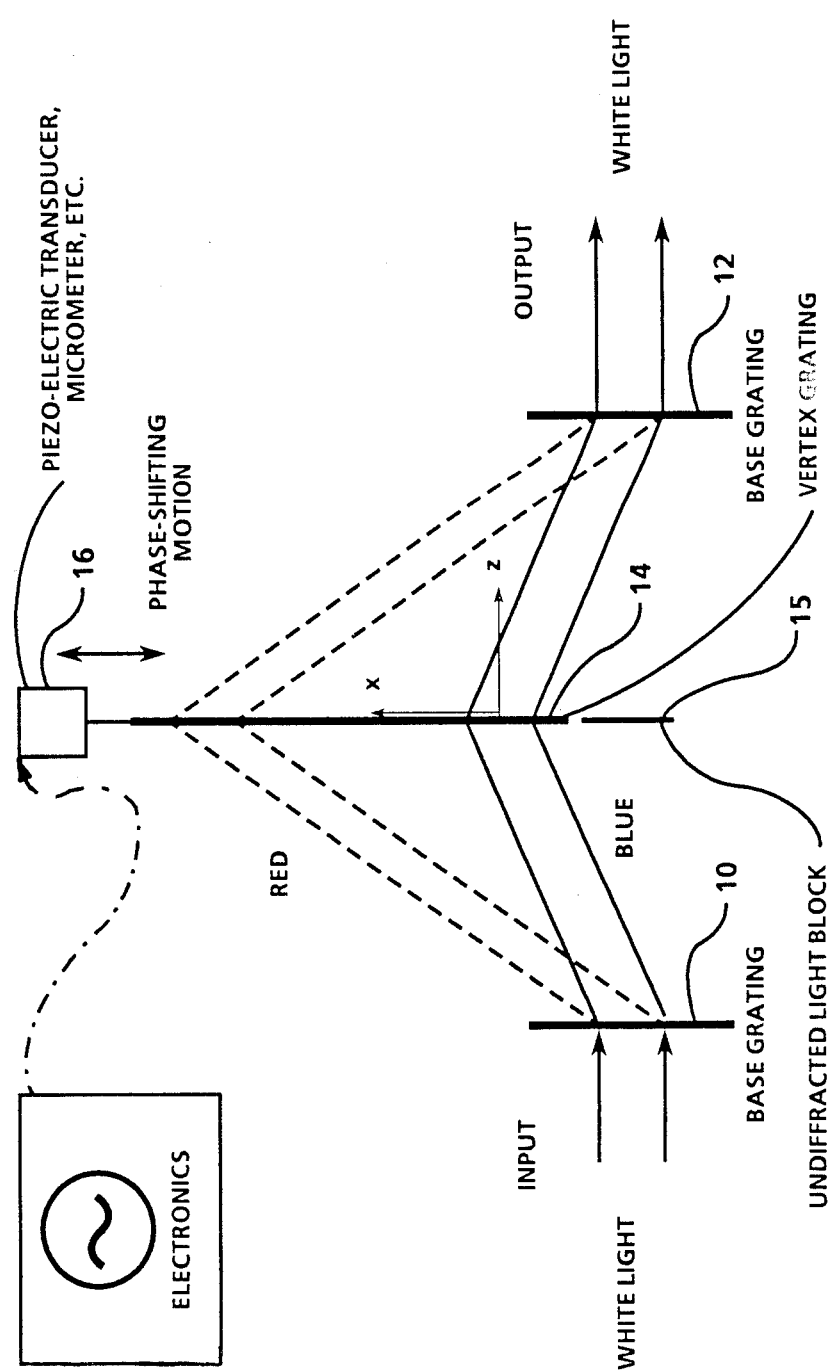
FIG. 1 is a schematic diagram of a broadband holographic phase shifter in triangular configuration.

A triangle configuration is illustrated in FIG. 1. This is one fundametal form of an achromatic phase shifter in accordance with the invention. Two "base" diffraction gratings 10 and 12 surround a central "vertex" grating 14 which is movable (linear translation) in its plane along the direction of modulation (x-direction in the figure). The spatial period $d_v$ (along the x-direction) of the vertex grating is half that of the corresponding spatial periods $d_b$ of each of the two base gratings. An opaque block 15 is provided to stop any undiffracted light from the first base grating.

In operation, broad-spectrum light (a beam of white light) is incident normally on the first base grating 10 and is diffracted toward the vertex grating 14. The effect of varied incident or field angles is discussed later. In this first diffraction, longer wavelengths (denoted symbolically as "red") are diffracted through larger angles than the shorter (blue) wavelengths; thus providing at the vertex grating 14 is dispersive angle of incidence which is coupled to the wavelength of incident light. The vertex grating 14 then diffracts this dispersed light back toward the second base grating 12 where the spectral components are spatially recombined and form the output. Movement of the vertex element (generally between two displacement positions $x_0$ and $x_1$) results in a fixed phase-angle shift of the output waves relative to the input waves which is independent of wavelength, as derived below. Modulation of this vertex grating position, for example by a temporal function $x_0(t)$, results in corresponding achromatic phase modulations in the output.

The base gratings 10 or 12 may be displaced, while the vertex grating 14 is stationary or any combination of these gratings can be relatively displaced to obtain phase shifts corresponding to their differential displacement.

It is further shown below that velocities along the x-direction imparted to the vertex element, as for example represented by the function $v_x(t)$, result in frequency shifts (change in temporal phase shift) in the output waves which are independent of wavelength.

In order to provide a better understanding of the invention and without limitation of any theory or mode of operation, the following analysis is presented. It is based in thin grating theory, with the addition of some well-known results from volume-gratins analyses. Explicit phase shifting calculations using volume grating theories are separately being performed using the thin grating decomposition, phased scatterer, coupled wave and modal approaches.

Consider a thin phase vertex grating located in the $z=0$ plane with modulation along x as illustrated in FIG. 1. Such as idealized thin phase grating was treated by Kogelnik, (H. Kogelnik, "Reconstructing Response and Efficiency of Hologram Gratings," Proc. Symp. Modern Optics, Polytech. Inst. Brooklyn, 1967, p. 605) and in text form by Goodman (J. W. Goodman, Introduction to Fourier Optics, (McGraw Hill, San Francisco, 1968), pp. 69–70), as a two dimensional (zero thickness) transmission function. According to this approach, the grating may be represented by a transmission function $t_v$ given by:

$$t_v = e^{iw\cos\left[\frac{2\pi(x-x0)}{d_v}\right]}, \tag{1}$$

where w represents the amplitude of the periodic phase variation of the grating, $d_v$ is the spatial period of modulation along the x-direction, and $x_0$ is a grating offset of displacement along x. It is the variable position offset $x_o$ that ultimately establishes the phase lag or lead for the herein described invention. Utilizing a generating function for Bessel functions, (I. S. Gradshteyn and I. M.

Ryzhik, Table of Integrals, Series, and Products (Academic, New York, 1965), Eq. (MO-27), p. 973) Eq. (1) may be expressed:

$$t_v = \sum_{q=-\infty}^{\infty} i^q J_q(w) e^{i2\pi q[\frac{(x-x0)}{d_v}]}. \tag{2}$$

It is apparent that the thin phase grating, when illuminated with a plane wave, is capable of creating a broad spectrum of diffracted waves whose amplitudes are determined by the Bessel function $J_q(w)$. For small modulations, the following asymptotic expansions for the Bessel functions may be applied:

$$J_0(w \to 0) = 1, \tag{3a}$$

$$J_1(w \to 0) = (w/2), \tag{3b}$$

$$J_{-1}(w \to 0) = -(w/2) \tag{3c}$$

$$J_q(w \to 0) = 0 \text{ for } |q| > 1, \tag{3d}$$

and thus for small modulations the thin phase vertex grating transmission function may be expressed:

$$t_v \simeq 1 + \frac{iw}{2}\left[e^{i2\pi[\frac{(x-x0)}{d_v}]} + e^{-i2\pi[\frac{(x-x0)}{d_v}]}\right]. \tag{4}$$

Using an exponential expansion for i, the phase-affecting terms may be consolidated into the exponentials, resulting in:

$$t_v \simeq 1 + \frac{W}{2}\left[e^{i\{2\pi[\frac{(x-x0)}{d_v}]+\frac{\pi}{2}\}} + e^{-i\{2\pi[\frac{(x-x0)}{d_v}]-\frac{\pi}{2}\}}\right]. \tag{5}$$

The three terms in the above transmission function give rise to three diffracted orders (0, +1, and −1) when the thin phase grating of small modulation is illuminated by a plane wave. As shown by George and Matthews (N. George and J. W. Matthews, "Holgraphic Diffraction Gratings," Appl. Phys. Lett. 9, 212 (1966)) volume Bragg effects in thick diffraction gratings as recorded holographically may be used to suppress all but a single diffracted order. It has also been shown that suppression of spurious orders may be maintained over extremely broad spectral bandwidths giving diffraction efficiencies in excess of 60% over the visible spectrum, for example. With these volume grating principles in mind and for brevity, the middle term in the above vertex grating transmission function will be treated below and the other terms representing "spurious" waves (which may be suppressed in volume gratings) will for simplicity be neglected. Zero- and higher-diffracted orders each exhibit characteristic achromatic phase shifts with grating displacement and may be used in the subject invention. This will be more completely discussed hereinafter.

The transmission function for the vertex grating as discussed above may be represented as:

$$t_v \simeq e^{i\{2\pi[\frac{(x-x0)}{d_v}]+\frac{\pi}{2}\}}. \tag{6}$$

In the same coordinate system as illustrated in FIG. 1, the y-component (perpendicular to the plane of the figure) of the electric field of a plane wave incident on the vertex grating may be expressed:

$$E_y(r_1) = E_0 e^{i(-k \cdot r_1 + \omega t)}, \tag{7}$$

where $E_O$ is the complex amplitude of the wave, $r_1$ is a position vector from the origin and k is the wavevector of magnitude $2\pi/\lambda$ and pointing in the direction of propagation. Assuming the plane wave to be propagating in the x-z plane at an angle $\theta$ with respect to the z-axis, the incident wave of Eq. (7) may be written:

$$E_y(x,y,z) = E_O e^{-ik(x\sin\theta + z\cos\theta)}. \tag{8}$$

with the $e^{+i\omega t}$ harmonic time dependence implicit in the above and all following equations representing waves. The exponential in this equation determines the phase at any point (x,y,z) between the first base and vertex elements relative to the phase at the origin, while the "absolute phase" is given by including the complex amplitude $E_0$.

The y-component of the field in the $z=0^-$ plane entering the vertex grating is denoted $E_y(x,y,0^-)$ and from Eq. (8) is given by:

$$E_y(x,y,0^-) = E_O e^{-ikx\sin\theta}. \tag{9}$$

Similarly, the y-component of the field in the $z=0^+$ plane exiting the vertex grating is denoted $E_y(x,y,0^+)$ and may be expressed in terms of the incident field [Eq. (9)] and the transmission function [Eq. (6)] as:

$$E_y(x,y,0^+) = E_y(x,y,0^-)t_v = \tag{10}$$

$$E_0 e^{-i\frac{2\pi}{\lambda}x\sin\theta(\lambda)} e^{i\{2\pi[\frac{(x-x0)}{d_v}]+\frac{\pi}{2}\}}$$

At this point it is convenient to rewrite the first term in Eq. (10) which represents the general wavelength dependent incident wave. In doing so the a priori knowledge of the wavelength-angle coupling resulting from the first base grating may be introduced. Since it has been assumed that all wavelengths are normally incident on the first base grating, the angles diffracted from the first base grating and hence incident on the vertex grating may be written:

$$\sin\theta(\lambda) = \lambda/d_b, \tag{11}$$

where as previously defined $d_b$ is the spatial period of the base gratings along the x-direction and $d_b$ is related to $d_v$ according to:

$$d_b/d_v = 2. \tag{12}$$

Combining Eqs. (11 and 12) gives the relation:

$$\frac{\sin\theta(\lambda)}{\lambda} = \frac{1}{d_b} = \frac{1}{2d_v}. \tag{13}$$

The above coupled angle-wavelength relation may now be substituted into Eq. (10) to give a new form for the output of the vertex grating:

$$E_y(x,y,0^+) = E_0 e^{-\frac{i\pi x}{d_v}} e^{i\{2\pi[\frac{(x-x0)}{d_v}]]+\frac{\pi}{2}\}} = \tag{14}$$

$$E_0 e^{i2\pi\{\frac{x}{2d_v} - \frac{x0}{d_v} + \frac{1}{4}\}} =$$

-continued $$E_0 e^{+i\frac{2\pi}{\lambda} x \sin\theta(\lambda)} e^{i\{\frac{\pi}{2} - 2\pi \frac{x_0}{d_v}\}}$$

The first exponential term of the exiting field represents plane waves which are diffracted downward toward the second base grating, with each wavelength propagating at angles symmetric with respect to those incident on the vertex grating (i.e., diffracted angles equal in magnitude to the incident angles but opposite in sign). The second exponential term is the achromatic phase shift induced in the output waves. It is seen that a motion of the vertex grating by 1 period (typically less than a micron) imparts a phase shift of $2\pi$ radians to all component wavelengths. Thus the triangle configuration as described imparts an achromatic phase shift $\Delta\Psi_{ach}$ to the incident wave in proportion to the displacement of the vertex grating $x_0$ according to the relation:

$$\Delta\psi_{ach} = -2\pi \frac{x_0}{d_v}. \quad (15)$$

For example an achromatic frequency shifter designed to produce a square wave phase shift between the phase amplitudes $+\pi/2$ and $-\pi/2$ could be implemented.

It will be apparent to those skilled in the art, from the previous analysis that the zero-order (undiffracted) beam is not phase shifted by the lateral displacement of the grating. Similarly, the phase shift imparted in the other first order beam is equal in magnitude to the phase shift as defined in Eq. (15), but opposite in direction. Higher diffracted order ($\pm 2$, $\pm 3$, etc.) are achromatically shifted in phase by integral multiples of the first-order phase shifts. These zero-and higher-order achromatic phase shifts and modulations are useful in some embodiments (particularly interferometers) of the subject invention.

Further, it is seen from the above analysis that a displacement of any of the base gratings induces an achromatic phase shift which is proportional to $2\pi x_0/d_b$.

The triangle configuration of FIG. 1 may also form an achromatic phase modulator, in which phase modulation is achieved by varying the position of the vertex grating with time. This time-varying displacement function may be realized by coupling the vertex grating 14 to an actuator 16, such as a piezo-electric drive, galvonometer, or dc motor, etc. Thus in the above analysis the grating shift $x_0$ is replaced with the function of time $x_0(t)$. Accordingly the output waves are modulated with an achromatic temporal phase function described by:

$$\Delta\psi_{ach}(t) = -2\pi \frac{x_0(t)}{d_v}. \quad (16)$$

The previous quasi-static analysis considering displacements in the vertex grating 14 of the triangle configuration has shown that such displacements lead to achromatic phase shifts in the output of the device. Below it is shown that velocities imparted to the vertex grating result in achromatic frequency shifts (temporal phase modulation) in the output waves.

Consider the case of uniform motion of the vertex grating 14 in the triangle configuration shown in FIG. 1. The vertex grating is assumed to have a constant velocity v in the x-direction, and thus the displacement $x_0$ in the previous quasi-status analysis may be replaced by:

$$x_0 = vt. \quad (17)$$

From Eq. (14) it is seen that the output of the vertex grating in the triangle configuration may then be represented:

$$E_y(x,y,0^+) = E_0 e^{+i\frac{2\pi}{\lambda} x \sin\theta(\lambda)} e^{i\{\frac{\pi}{2} - 2\pi \frac{vt}{d_v} + \omega t\}} \quad (18)$$

The new time dependent term in the second exponential provides a shift in the harmonic time dependence of the waves which is wavelength independent and given by $\Delta\omega_{ach}(v)$:

$$\Delta\omega_{ach}(v) = -2\pi \frac{v}{d_v}. \quad (19)$$

It is therefore evident that a uniform motion of the vertex element in the triangle configuration results in a frequency shifting device which provides an achromatic frequency shift in the output waves according to the above relation.

Consider the case in which a compound motion, such as sinusoidal or even more complicated form, is to be used. Then, for a general $x_o(t)$, we write the time varying term as follows:

$$v(t) = e^{i\omega_0 t - i 2\pi \frac{x_0(t)}{d_v}}. \quad (20)$$

The spectrum of this signal is determined, in general, by calculation of the temporal Fourier transform $V(\nu)$ of v(t), defined by the equation:

$$V(\nu) = \int_{-\infty}^{\infty} v(t) e^{-i 2\pi \nu t} dt. \quad (21)$$

Substitution of Eq. (20) into Eq. (21) gives a formal result, as follows:

$$V(\nu) = \int_{-\infty}^{\infty} e^{i[\omega_0 t - 2\pi \frac{x_0(t)}{d_v} - 2\pi \nu t]} dt. \quad (22)$$

For many special cases of $x_o(t)$, one can show that the frequency shift in the spectrum given by $V(\nu)$ in Eq. (22) is independent of $\omega_o$. The details of these calculations are well-known to those versed in the art.

Other embodiments of the invention which provide achromatic phase/frequency shifter/modulators are described hereafter in connection with FIGS. 2-14.

Figure 2:
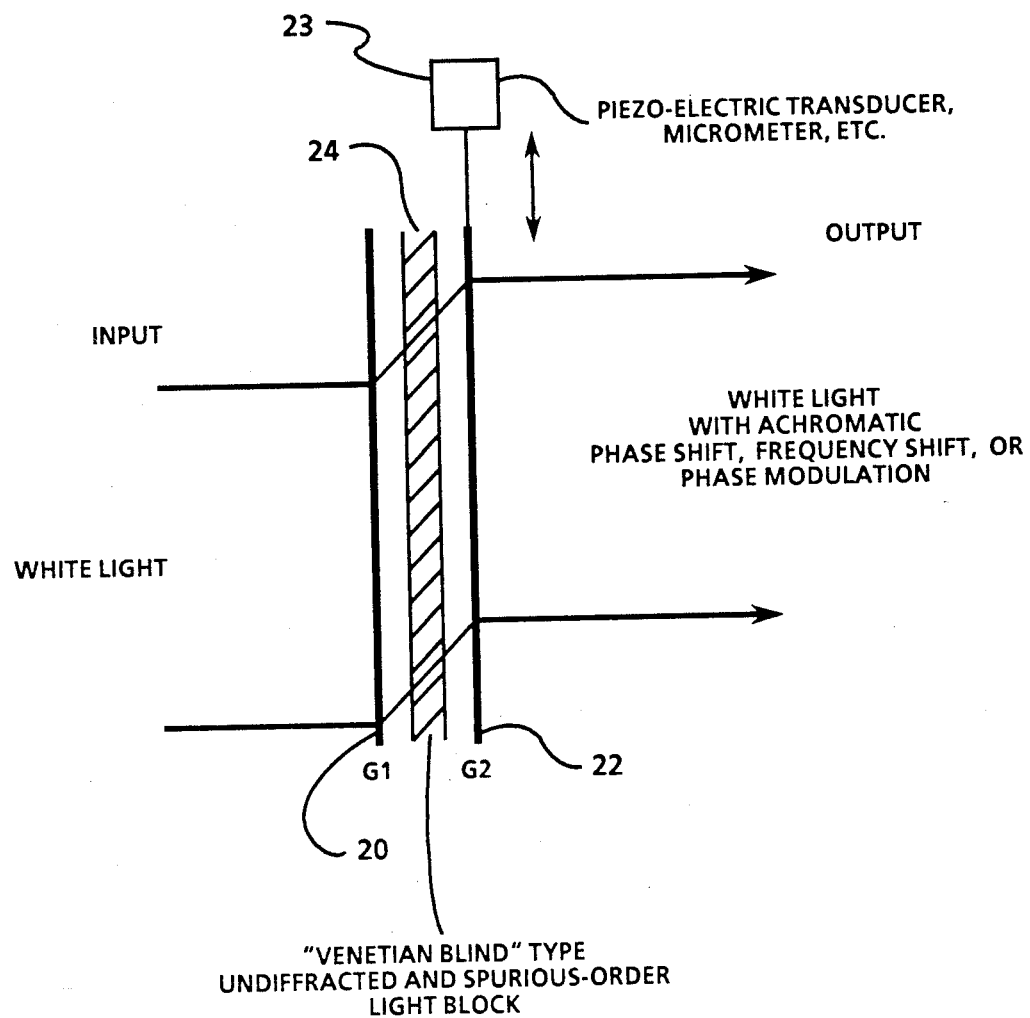
FIG. 2 is a schematic diagram of a broadband holographic phase shifter in close cascade configuration.

A close cascade configuration is illustrated in FIG. 2. Two cascaded gratings $G_1$ and $G_2$, 20 and 22 of equal period are used. Broadband (white) light incident on the first grating 20 is angularly dispersed and then is incident on the second grating 22 which restores the waves to their original propagating direction. Undiffracted or spurious-order light may be blocked by the introduction of a venetian-blind type member 24. Achromatic phase and frequency shifts are introduced in the output waves by movement of one or both of the component gratings as described for the base gratings of the triangle configuration (FIG. 1). An actuator 23 coupled to one of the gratings, either the output grating 22 as shown or the input grating 20. Or actuators may be coupled to both gratings 20 and 22. It will be appreciated that, if the dispersion of the light at the first grating can be tolerated, that a phase shifter can be implemented using a single grating which is linearly translated across the beam path.

In a preferred embodiment of the device shown in FIG. 2, the gratings 20 and 22 are fabricated in a volume phase recording material with parameters such as refractive index modulation, element thickness, spatial period, etc. chosen to maximize diffraction efficiency over broad spectral and angular bandwidths.

Figure 3:
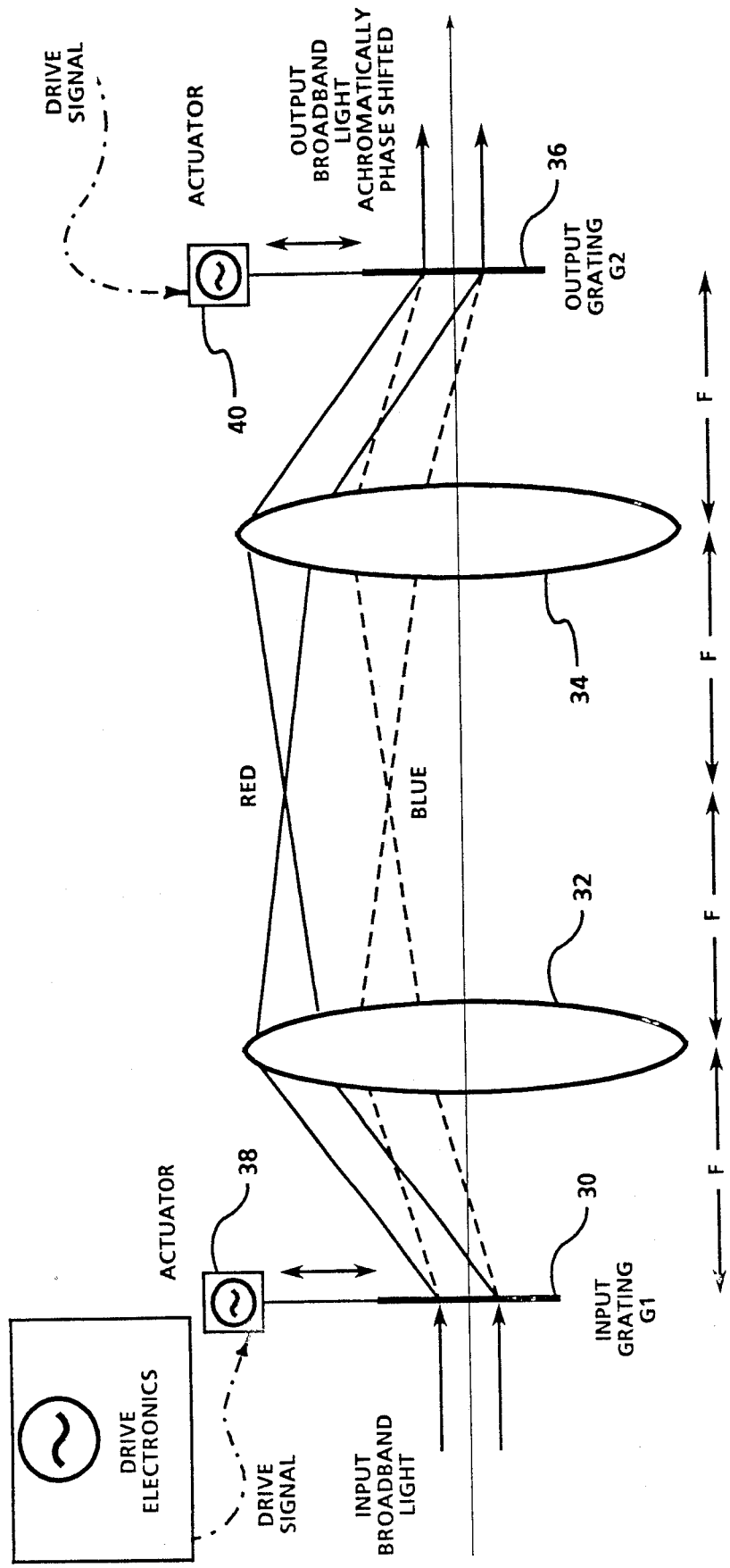
FIG. 3 shows a phase shifter or phase modulator in another form of cascade configuration where the input grating is imaged on the output grating by means of achromatic lenses.

Another embodiment of the invention which is useful as a broadband achromatic phase/frequency shifter is illustrated in FIG. 3. This is an imaged grating configuration. An input grating 30 is imaged with a two lens 32 and 34 unity magnification optical processor which successively Fourier transforms the field exiting the first grating 30 twice. In this system the imaging lenses perform a similar function to the vertex grating of FIG. 1 in returning the varied spectral components diffracted by the first grating symmetrically to the second grating 36. This symmetry results in the spatial recombination by the second grating 36 of the waves dispersed by the first grating as in the triangle cascade of FIG. 1.

The phase and frequency shifts are obtained in this configuration by movement of one or both of the gratings as by actuators 38 and 40 in similar fashion to that described for the gratings of the triangle configuration (FIG. 1) or in the close cascade shifter (FIG. 2). Other imaging techniques may be used to image the two gratings on each other, including lens and mirror systems. However the two lens Fourier Processor imaging system shown may be superior in some applications due to its accurate phase imaging characteristics, e.g., imaging without the quadratic phase factors across the output which are present in other imaging systems.

The imaged grating phase/frequency shifter/modulator configuration has many desirable properties. For example the imaging relationship between the two gratings results is a very useful property when the device is used with light input throughout a broad field angle (i.e., of limited spatial coherence). Then, broad spectrum light incident on an input-grating point from all field angles exits the system at the imaged point on the exit grating. In some applications this is much more convenient than the field-angle dependant spatial separation of each spectral component which exists in the output of the triangle configuration devices. Further if input light is restricted to sources lying in a plane containing the optical axis or the input light is collimated, then only cylindrical lenses are required in the imaging configuration. Also, if high efficiency volume holographic elements are utilized for the gratings and the input is collimated, only partial apertures are required for these cylindrical lenses.

Figure 4:
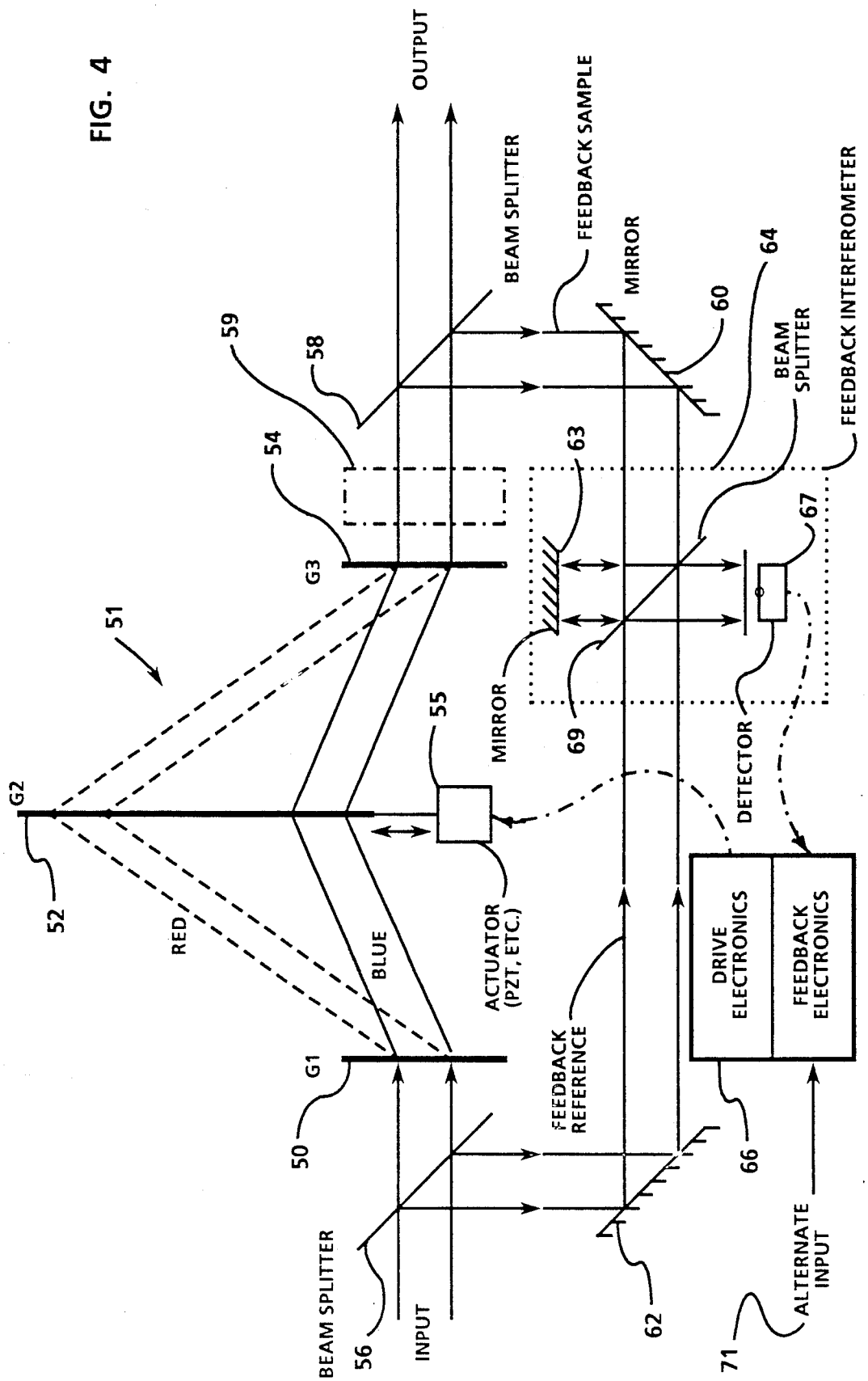
FIG. 4 is a schematic diagram of a closed loop feedback achromatic phase shifter in accordance with the invention.

FIG. 4 shows an achromatic phase shifter 51 of triangular configuration configured in a closed loop device. Feedback through an interferometer 64 is used to control the actuator 55 of the center grating 52 of the phase shifter 51. This actuator may in practice be located on any of the component gratings of achromatic phase shifter 51. The actuator is illustrated as a electrostrictive transducer 55 which may use a PZT electrostrictive element. The other gratings 50 and 54 of the phase shifter are fixed. Light input is applied to the grating 50 and is sampled by a beam splitter 56 which may suitably sample approximately 1% of the light. This sample is directed by a mirror 62 into the interferometer 64. Alternatively, the undiffracted (zero-order) beam from the first grating may be used as the input sample beam. A sample of the output from the phase shifter 51 is taken by another beam splitter 58, also suitably a 1% beam splitter and is directed by a mirror 60 into the feedback interferometer 64.

The feedback interferometer has a mirror 63 at one end thereof and a photo detector 67 at the opposite end thereof. A beam splitter 69 directs both the feedback reference and the feedback sample beams to the detector. The detector 67 detects a varying signal in accordance with the phase relationship of the feedback sample and feedback reference beams. This signal is applied to feedback electronics 66 which also contains an amplifier (drive electronics) which drives the transducer 55. If the mirror 63 of the interferometer is fixed, the transducer 55 may be actuated so that a fixed phase delay between the white light input and the white light output is obtained Other inputs may be provided to the feedback interferometer to obtain other control effects on the phase shift obtained by the phase shifter 51. An input signal through an actuator may vary the displacement of the mirror 63, in which case the output of the interferometer 64 will vary and a variable phase shift corresponding to the variation in the signal which is applied to the mirror 63 is obtained. Alternatively, an alternate input indicated at 71 may be applied to the feedback electronics 66 to modulate the phase in accordance with this alternate input, while the feedback system maintains the stability of the loop.

A target optical system which relies upon a wave front of certain phase, for example in hologram recording, may use the feedback phase shifter shown in FIG. 4. This system is shown diagramatically by the dash lines 59. It is inserted at the output of the output grating 54 of the phase shifter 51. Any phase shift inserted by the target system 59 is detected in the feedback interferometer and the phase shift which is inserted is detected and used to control the phase of the wave front to the target system 59, because the transducer 55 is displaced accordingly A signal for controlling the phase shift may also be applied directly to displace the mirror 63 in the interferometer 64. In the latter case, an actuator which receives the phase control signal is connected to the mirror for displacing it in accordance with the control signal.

The feedback interferometer 64 may be a white light interferometer. Path balancing or compensation as is required in accordance with interferometry techniques known in the art may be used. The interferometer may, alternatively, be operative over a narrow spectral band and a suitable filter is placed before the detector 67. In the latter case in order to increase the signal to noise response of the system, a monochromatic beam, as from a laser, which is in the spectral band to which the detector 67 is responsive may be superimposed on the white light input and fed through the phase shifter into the interferometer 64. Accordingly, the beam splitters 56 and 58 may be narrow-band dichroic devices centered on the laser frequency.

Figure 5:
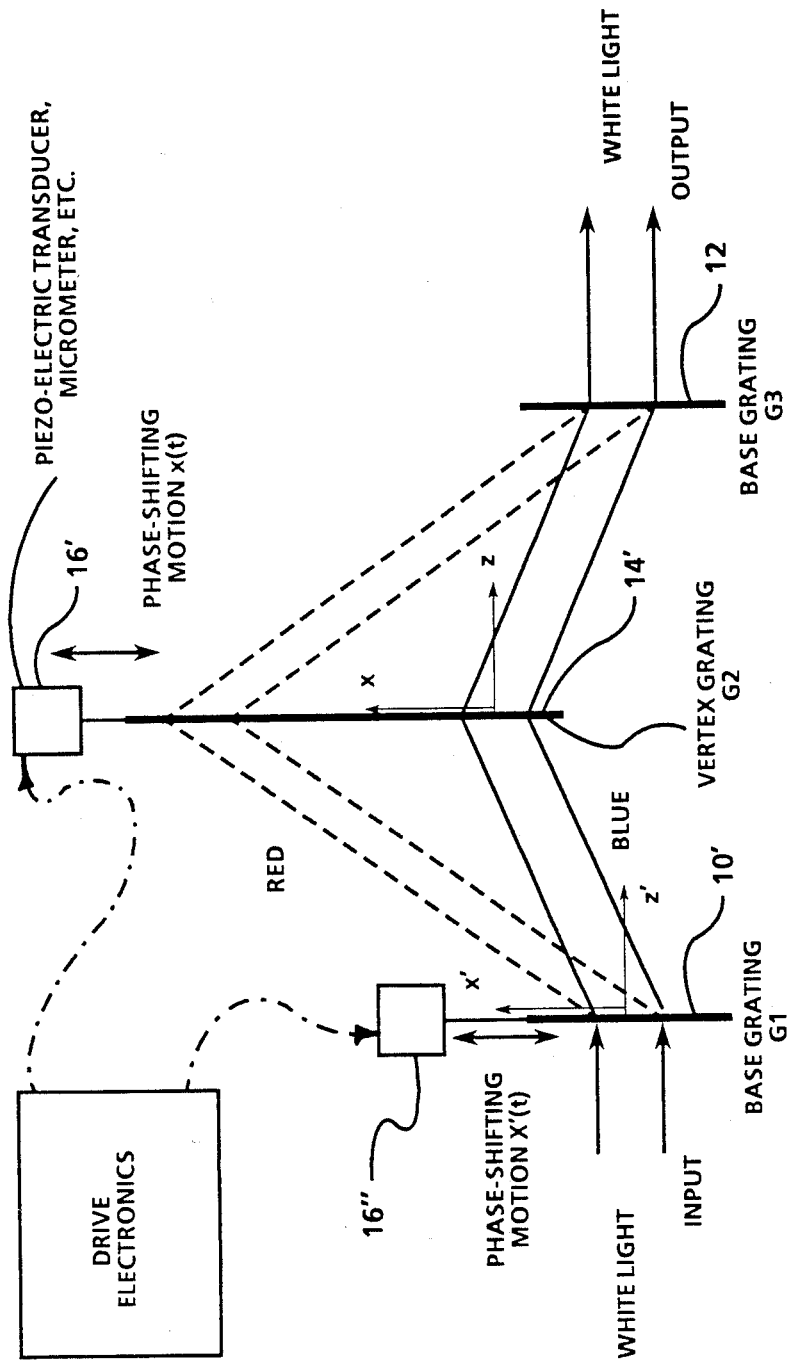
FIG. 5 is a schematic diagram of a phase shifter similar to that shown in FIG. 1 but used in a differential phase shifting mode.

In each of the basic phase-shifter configurations discussed, more than one of the diffractive elements may be simultaneously tuned (displaced), with either additive or differential effects. In the triangle configuration for example, moving either of the base gratings (10 and 12 in FIG. 1) in the +x direction advances the phase in the same fashion as moving the vertex grating 14 (FIG. 1) in the −x direction. Thus, any combination of the achromatic phase shifter's component gratings may be driven in order to increase net shifting rate and the resolution of the phase shift. One such case is illustrated in FIG. 5 where both the first base grating 10′ and vertex grating 14′ are electronically driven by actuators 16′ 16″. If both gratings 10′ and 14′ are driven in the same direction, the induced phase shifts will be in opposite directions and finer phase resolution can result. When combining multiple element tuning, it should be noted that the magnitude of phase shift introduced by moving any of the component gratings is proportional both to the distance that element is moved and the spatial frequency f of the element; $1/d_v$ for the grating 14′ and $1/d_b$ for the grating 10′.

From FIG. 6 (FIGS. 6A–E), it will become apparent that a broad variety of phase shifting white-light, multi-wavelength, and monochromatic interferometers may be constructed with the basic type of achromatic phase shifters described above FIG. 6A shows a triangle interferometer, the first base grating 80 diffracts the incident white light beam into symmetric +1 and −1 diffracted orders which then illuminate the vertex grating 82. This vertex grating may be two separate gratings, but in this example will be taken to be a single extended grating Both diffracted orders symmetrically exit the vertex grating 82 and are recombined by the final base grating 84. This separation and then recombination forms the basis of a white-light interferometer, in which the optical path length is identical for a given wavelength traversing either the +1 or −1 diffracted order path. In this device movement (linear displacement) of the vertex grating 82, as by an actuator 81 which is driven by a signal from drive electronics 83 in a direction perpendicular to its rulings, by ⅛ of its spatial period, for example, shifts one order by +pi/4 and the other by −pi/4, resulting in a net pi/2 phase change.

Figure 6A:
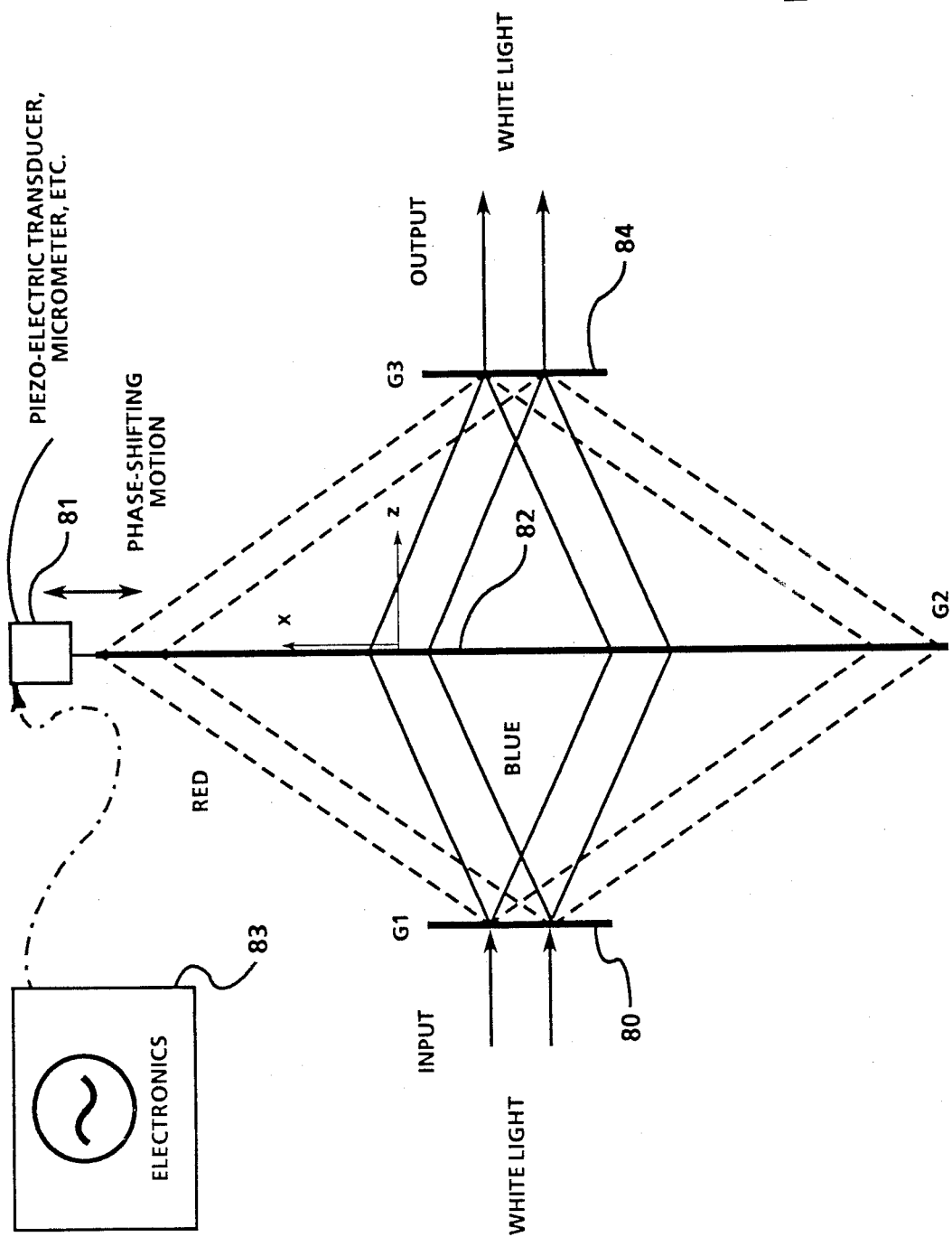
FIGS. 6A to 6E are schematic diagrams of interferometers using triangular phase shifter arrangements (FIGS. 6A, B and C), where in FIG. 6B two outputs are coupled to each other and are phase locked or counter tuned to repetitively change between in and out of phase relationship, and where in FIG. 6D imaged gratings are used in a twin-imaged interferometer and in FIG. 6E a white light interferometer utilizing the zero and first diffracted orders is shown.
Figure 6B:
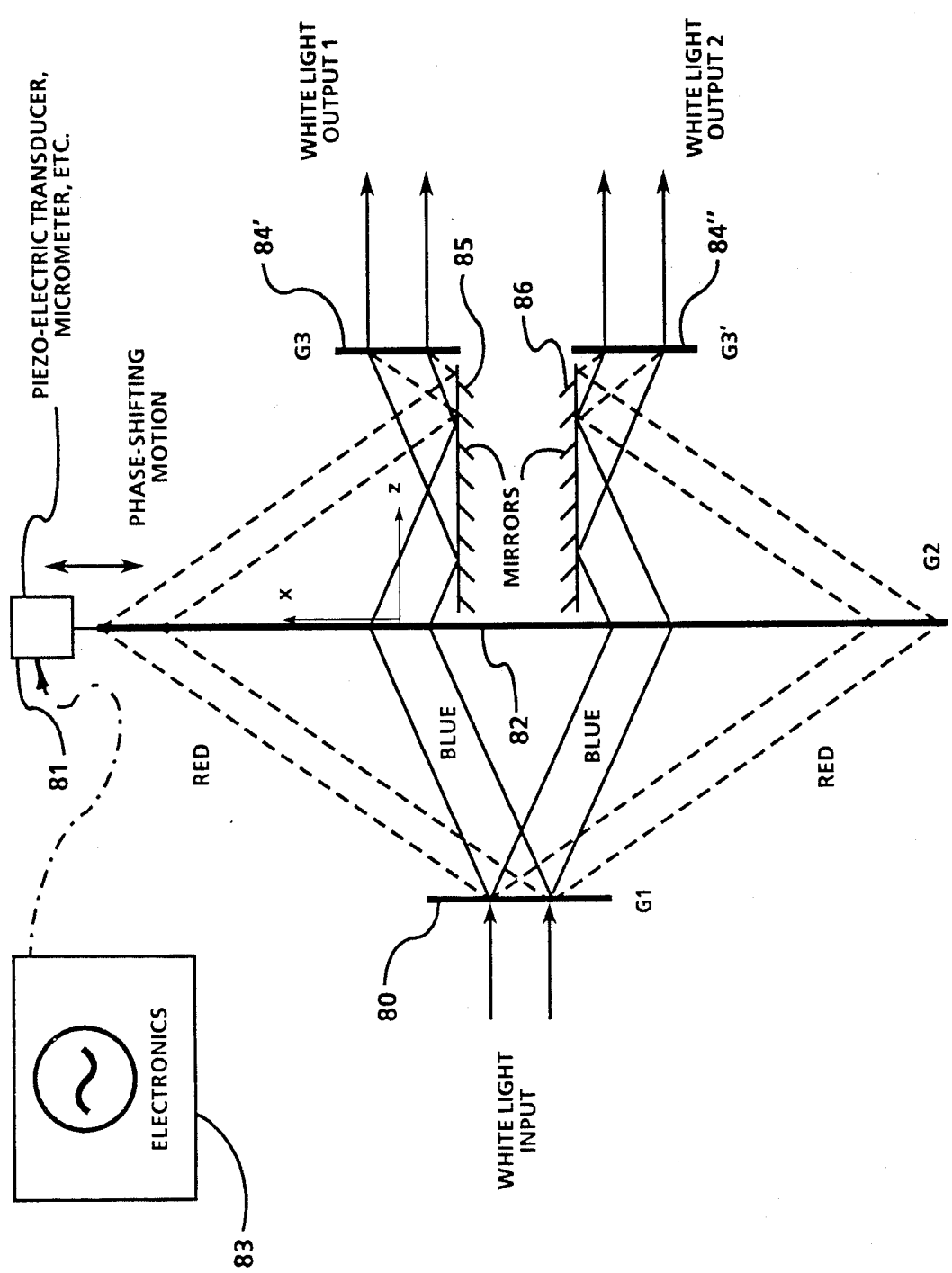

In FIG. 6B, the base grating 80 and the vertex grating 82 with its actuator 81 and control electronics 83 are also used. The two orders are separated after diffracting from the vertex grating 82 and are transmitted via mirrors 85 and 86 to base gratings 84′ and 84″. The latter may be fixed. Their outputs are counter tuned and move out of and into phase as the vertex grating is displaced. The system is therefore an anti-coupled achromatic phase shifter. The vertex grating 82 may be fixed and the base output gratings 84′ and 84″ may be coupled to move toward and away from each other while remaining in the same plane. If they move toward each other, both outputs will advance in phase in a forward sense. Conversely when the gratings 84′ and 84″ move away from each other the outputs are retarded in phase, equally with like displacement. Accordingly, a white light input beam is split into two exiting white-light beams which may be tuned in opposite senses as desired. In the counter-tuned case (with the base gratings 84′ and 84″ stationary) the vertex grating (or first base grating or both as in FIG. 5) is displaced which shifts the phase in each of the exiting white light beams in opposite directions with a magnitude of 2 pi times the number of grating periods of shift. Alternatively the two final base gratings may be displaced independently or in tandem providing full freedom of achromatic phase shift directions and magnitudes. The output beams from the base gratings may be applied to an interferometer to obtain measurement of the relative phase shift of the two outputs or in other measurement or processing applications.

Figure 6C:
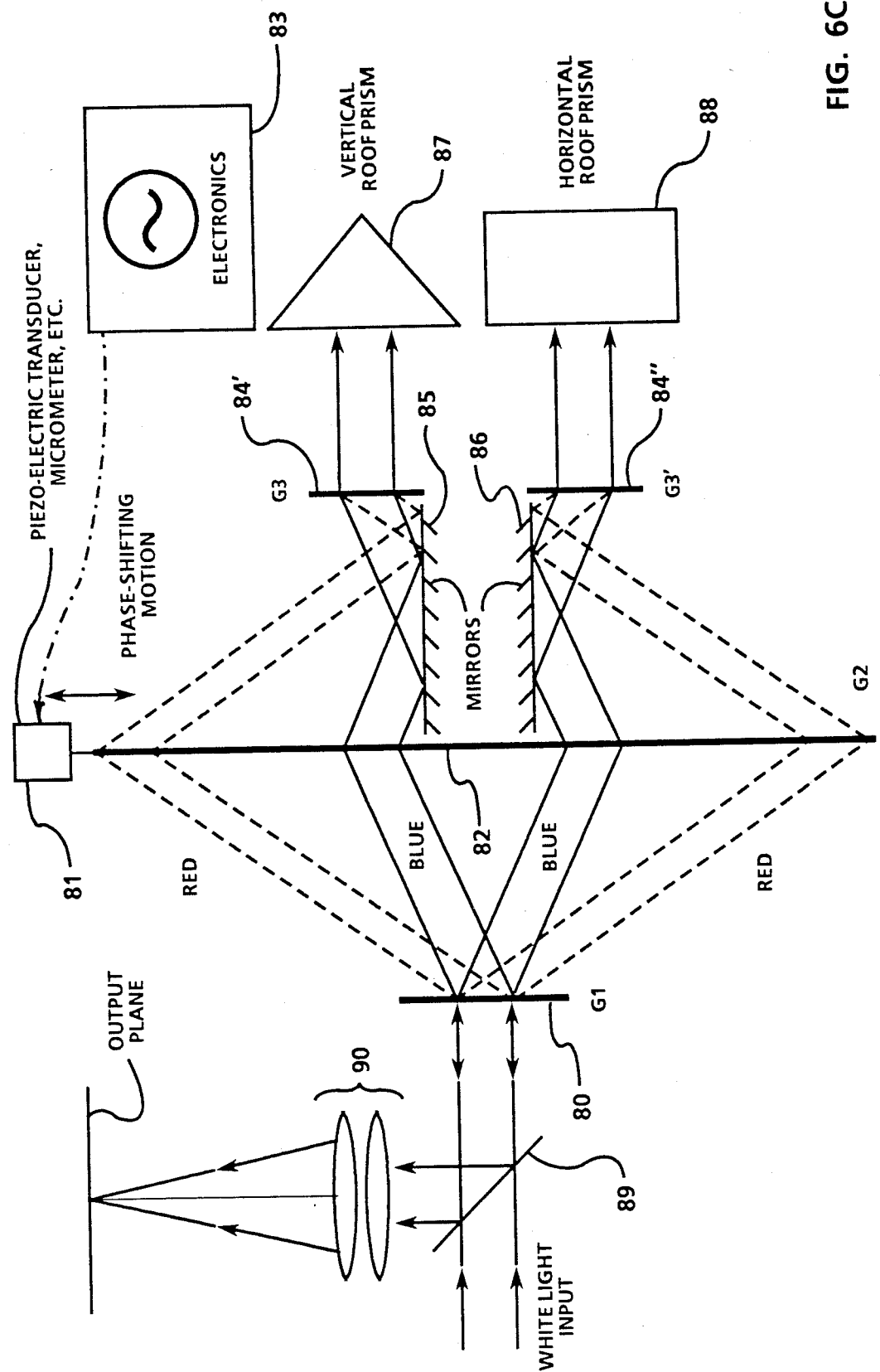

In the configuration of FIG. 6C, where parts similar to FIG. 6B are shown with like reference numerals, the two exiting white light beams are retro-reflected using crossed roof prisms 87 and 88. The retro-reflected exiting beams are combined and separated using a beam splitter 89 and interfere. A detector or detector array (not shown) may be located at the output plane. This interferometer may be used to obtain spatial sine and cosine transforms of the incident scene. In this application a Fourier Achromat lens 90 is used and the displacement of the grating 82 (or 80) may be used to rapidly switch or modulate between spatial sine and cosine transforms.

Figure 6D:
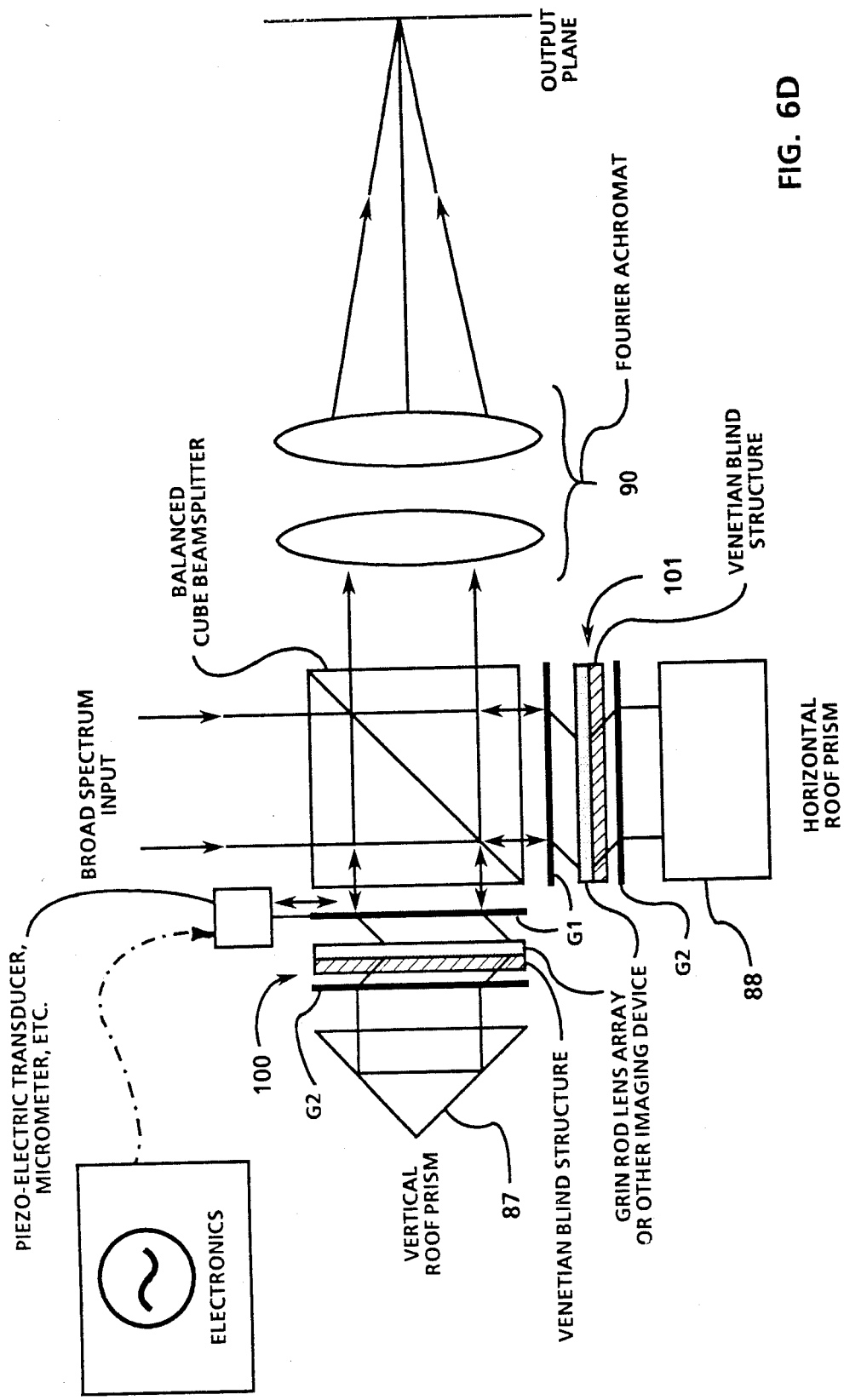

FIG. 6D shows the phase shifter in imaged grating configuration applied to a white light interferometer, as described by N. George and S. G. Wang in Applied Optics referenced above, in an automatic pattern recognition and optical information processing system. Matched achromatic phase-shifters of the type described in connection with FIG. 3 are inserted in each leg of the twin imaging interferometer. This device is drawn diagramatically using the gradient-index rod-lens (SELFOC) arrays imaged grating configuration of phase shifter. Triangular, close cascade and other imaging types of phase shifters can alternatively be used. In the achromatic phase shifters 100 and 101, a thin sheet of venetian blind plastic (e.g., light control film) is inserted in the cascade of two gratings G1 and G2 and the lens array in order to block spurious diffracted orders. Tuning one or both of the phase shifters may be performed with the actuator (e.g., a piezoelectric drive) to accomplish shifting of the interferometer between sine-transform and cosine-transforms regimes. The second achromatic phase shifter 101 is included, if required, to balance the white-light optical path lengths in the two interferometer arms.

Figure 6E:
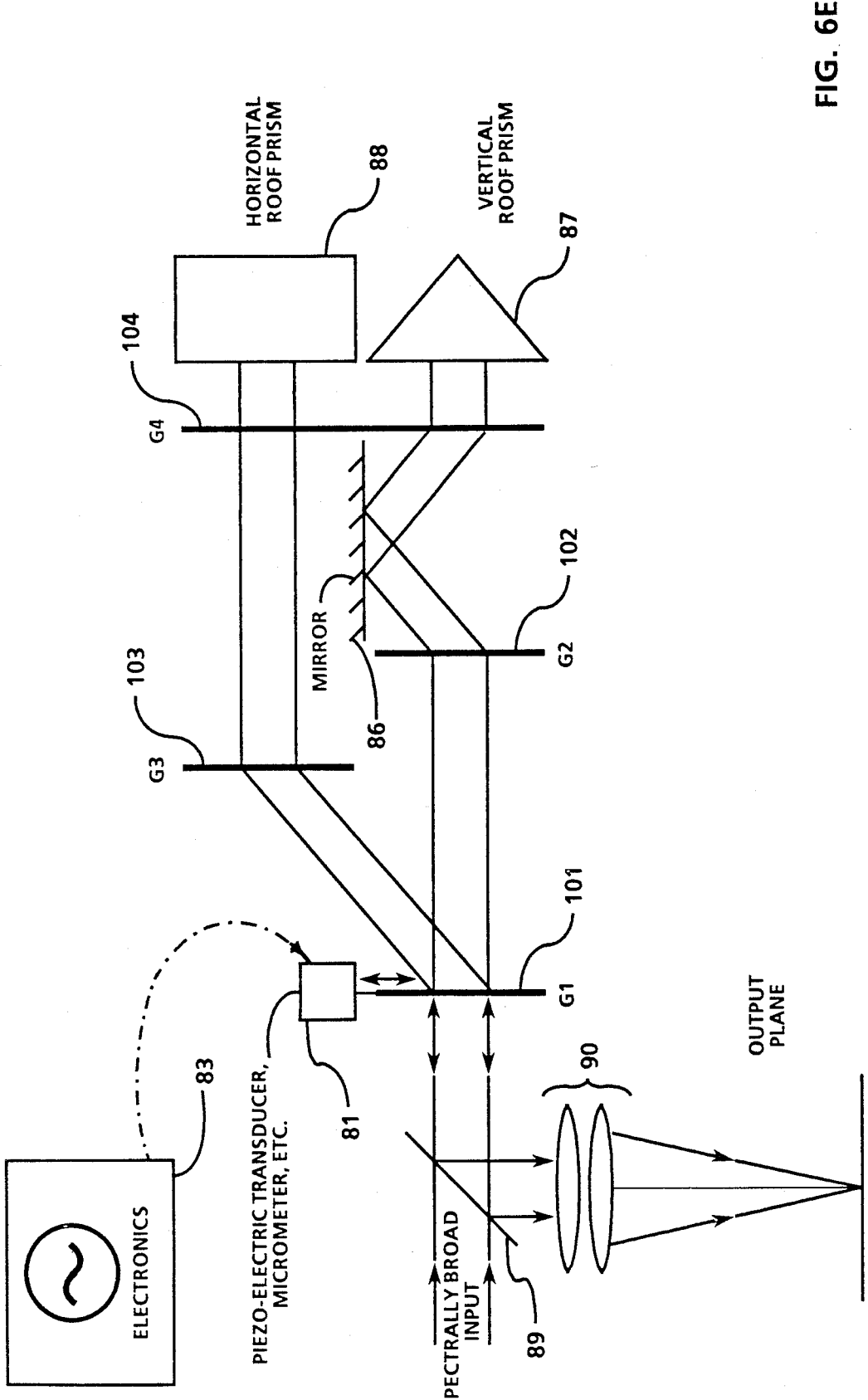

FIG. 6E illustrates a white light interferometer related to that of FIGS. 6C and 6D, but where the zero-order beam is utilized. In this device the undiffracted- and first-order beams of the entrance grating 101 define the two legs of the interferometer. Gratings 102–104 complete the symmetry of the two paths with mirror 86 separating them spatially. In this implementation crossed roof prisms are illustrated in conjunction with beam splitter 89 so to retroflect and separate the combined return beam. Displacement of any of the gratings, for example 101 as shown, introduces an achromatic phase shift in the diffracted leg while leaving the zero-order leg unaffected. Thus with the use of Fourier Achromat 90, this device may be useful in obtaining spatial sine and cosine transforms. The gratings 101–104 which diffract 50% and transmit 50% of the incident light as illustrated are readily fabricated using volume transmission holographic elements. To block the zero order light passing through the grating 102, an opaque member 15 may be used.

Figure 7:
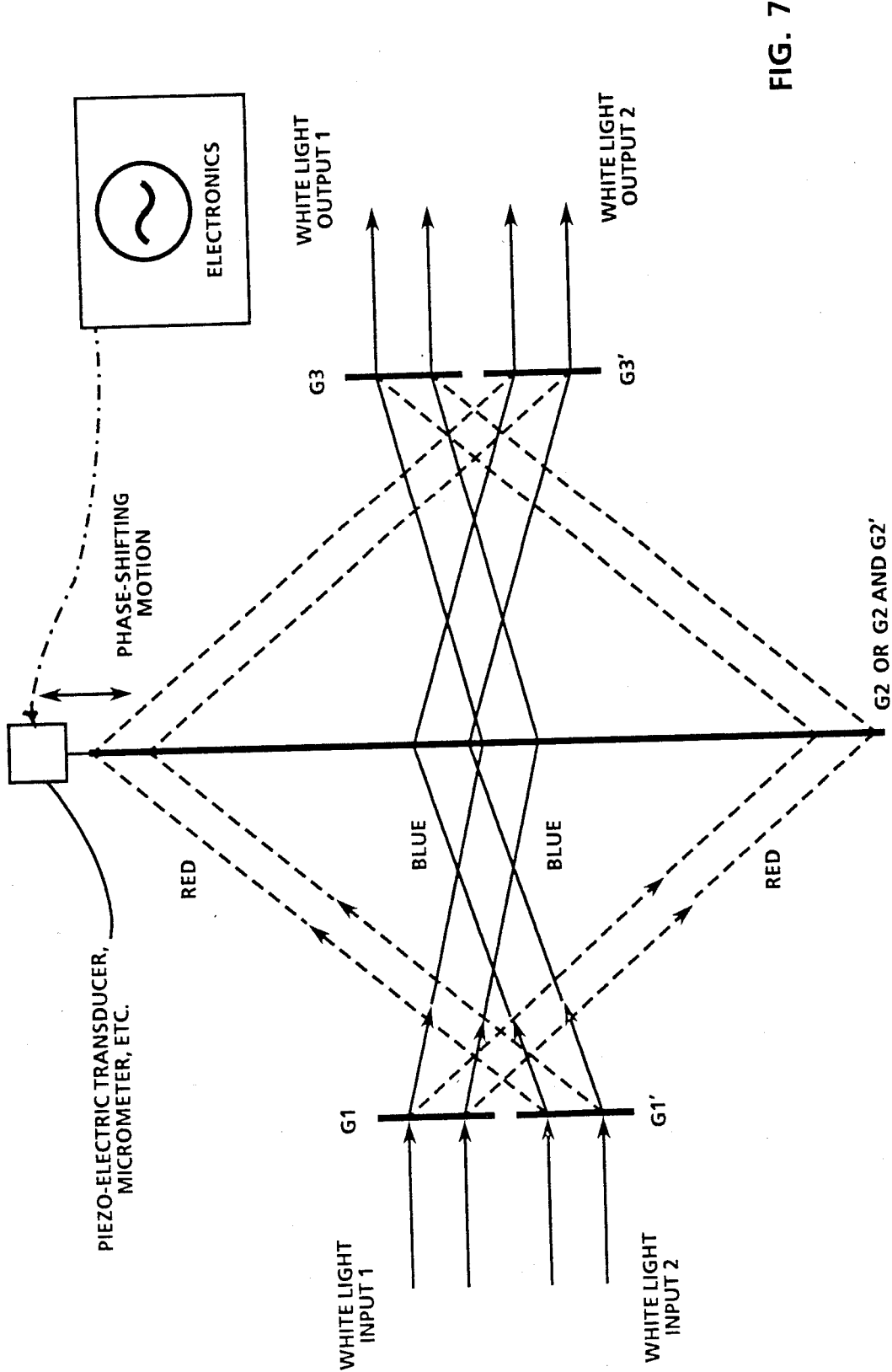
FIG. 7 is a schematic diagram of another arrangement of triangular configuration which also provides coupled outputs.

FIG. 7 illustrates another variation of the achromatic phase shifter of FIG. 6A which permits spatial separation of the two frequency shifted beams and is useful in interferometry. In this device separate base gratings G1, G1′ and G3, G3′ are used for each of two input white light beams, which may be derived from each other by division of a single incident white light wavefront for interferometer applications. The splitting of the wavefront before the first base gratings G1 and G1′ allows use of highly efficient volume holographic gratings. Further, these two gratings G1 and G1' may be combined by superposing the two structures in a single superposed holographic element. The output beams can be applied to an interferometer or other device responsive to their relative phase.

Figure 8:
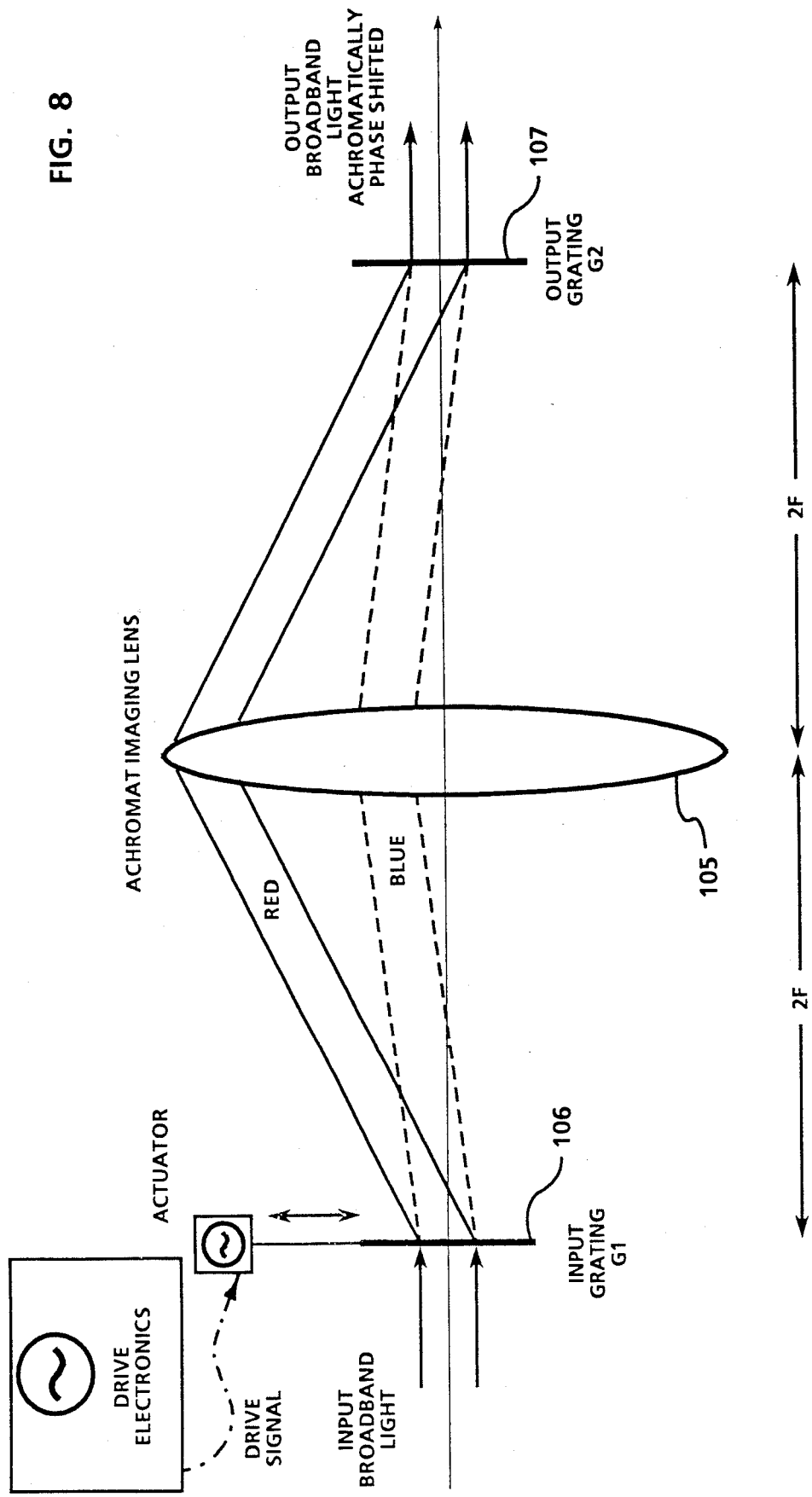
FIG. 8 is a schematic diagram of another imaged grating configuration of the type shown on FIG. 3 using a single achromatic lens.

The imaged grating configuration of FIG. 8 is similar to FIG. 3. As with the two lens 4-F configuration of FIG. 3, a single achromatic lens 105 is used. This lens may be cylindrical in special cases, including for use with an axial collimated wave input beam. Two gratings 106 and 107 of the same frequency are separated by four times the focal length of the lens 105, with the lens in the center of the gratings. This provides for unity magnification.

Figure 9:
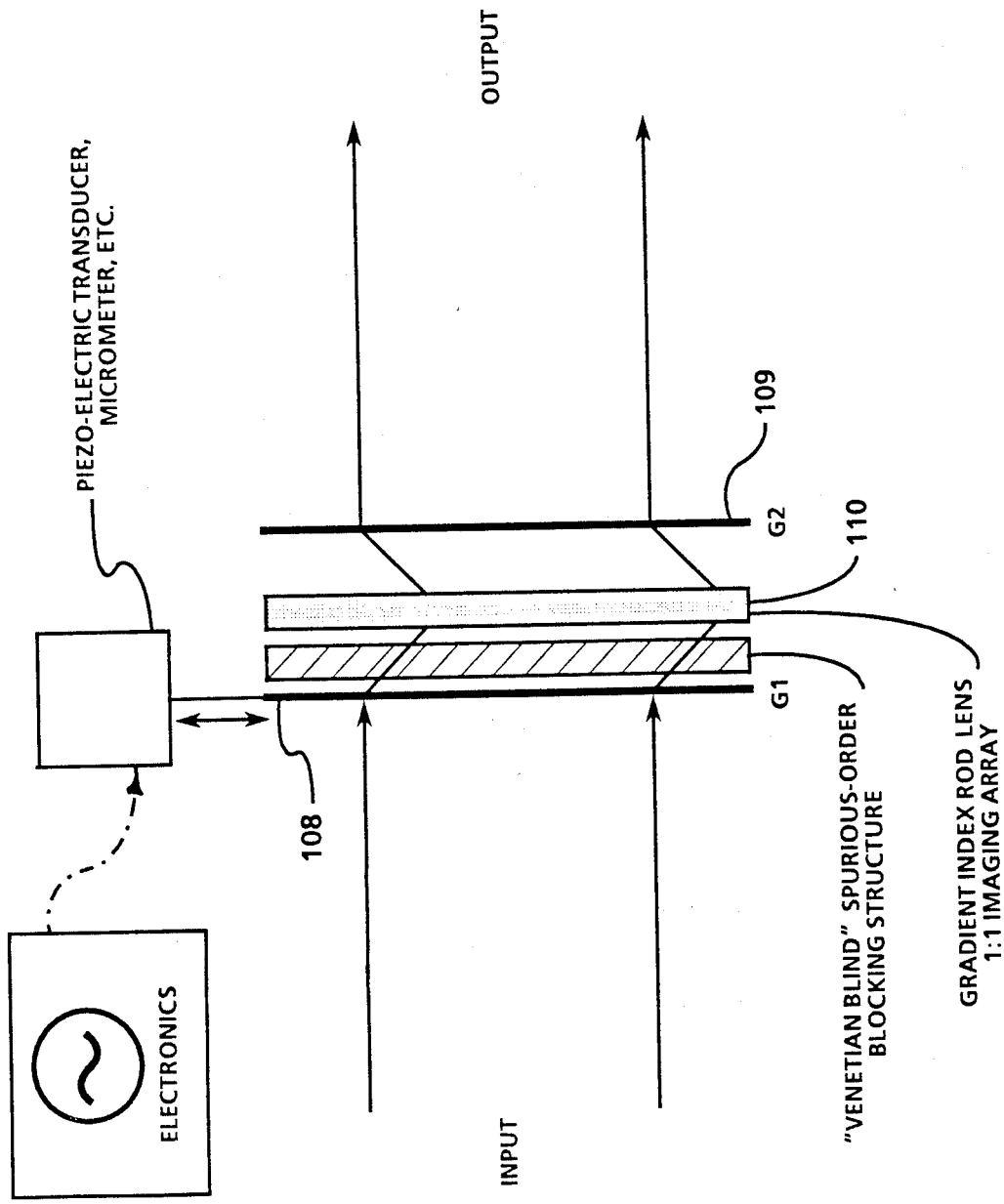
FIG. 9 is a schematic diagram of another imaged grating configuration which can be made in a small size through the use of gradient index (Selfoc) rod lenses.

A related compact achromatic phase shifting device is illustrated in FIG. 9. The input and output gratings 108 and 109 are in conjugate imaging planes of a gradient index rod-lens array 110 (for example, the Selfoc lens arrays). This configuration provides many of the advantages of imaged grating configurations while maintaining the compact size of the close-cascade configuration. Further, a sheet of venetian blind louvered material may be inserted between the diffractive components in order to block any spurious diffracted orders.

Figure 10:
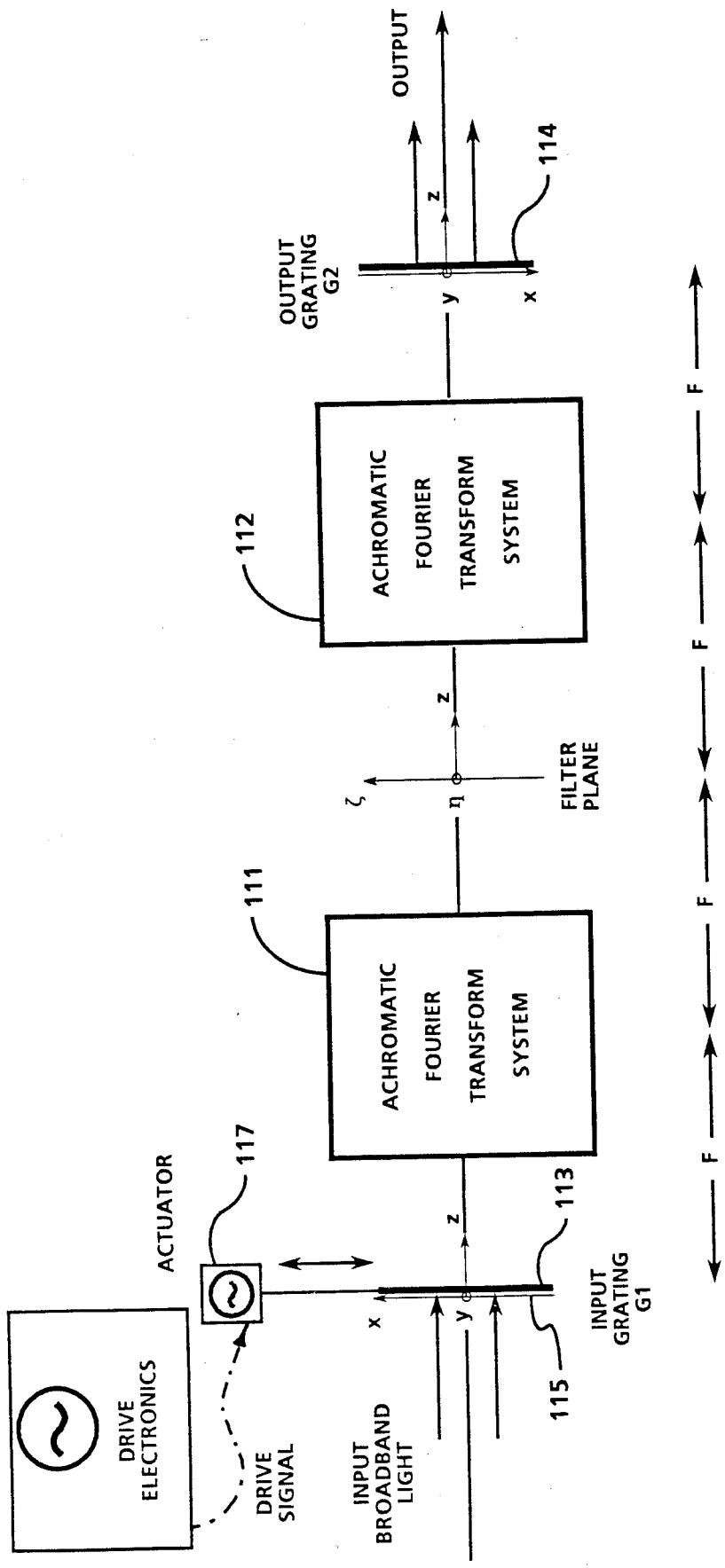
FIG. 10 is a system for broadband achromatic phase shifting or modulation wherein devices which provide achromatic Fourier transforms are used between the gratings and wherein the image carried by the beam is processed by an optical filter in a filter plane between the transform devices.

Broadband achromatic phase shifters in accordance with the invention may be applied to optical processors. FIG. 10 illustrates a canonical Fourier processor which is composed of two achromatic Fourier transform devices 111 and 112 (e.g., spherical lenses and/or holograms) in succession. Gratings 113 and 114 are placed in input and output planes, forming an imaged grating achromatic phase shifter. Collimated white light is incident on a mask 115 (containing the input function) which is in contact with the first grating. The zero spatial frequency is biased at an off-axis angle (off the z axis) as determined by the grating. Translation of the grating in a direction perpendicular to its rulings (along the x axis) as by the actuator 117 and its drive, will shift the phase of this undiffracted light by an achromatic amount, while waves diffracted by the mask (in the same plane) to other angles will be shifted differing wavelength-dependent amounts. Another grating similar to the grating 116 with its lines perpendicular to the lines of grating 116 may be used (cross-tuned—moved perpendicularly to the grating 116) to enable a subtraction of the zero-order component of the light diffracted by the mask. Alternately, this other grating may precede the mask to phase shift its illumination. Similarly the input mask (which may be treated as a complex grating), and the output grating 114 may be tuned by displacing them with linear displacements in the x direction.

Figure 11:
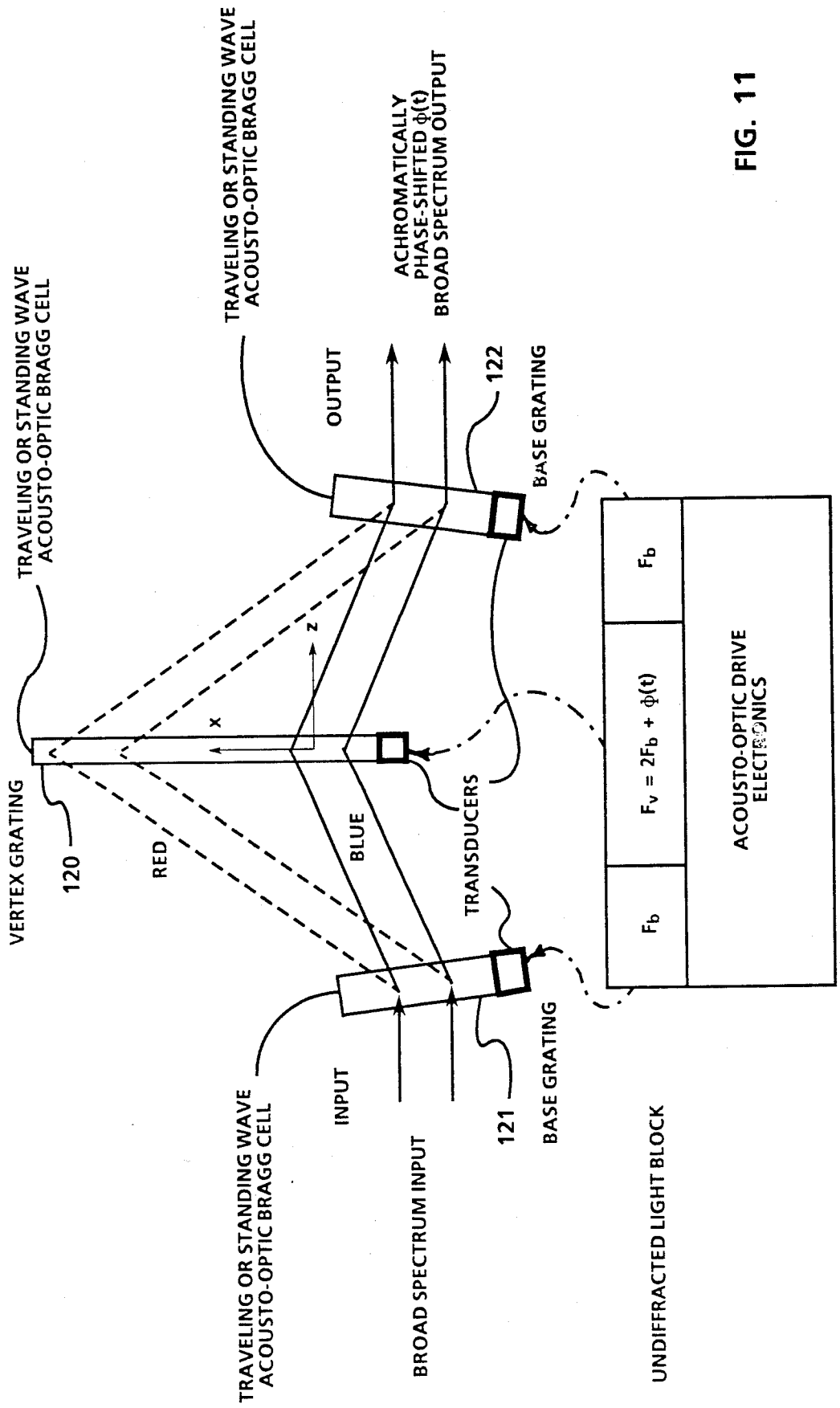
FIG. 11 is a schematic diagram of a triangular phase shifter/modulator configuration in accordance with the invention which utilizes acousto-optic cells to provide the diffraction elements.

The achromatic phase shifters described previously are tuned by mechanical or electro-mechanical actuators, e.g., with micrometers, rotating gratings, stepping motors, piezoelectric drives, etc. Achromatic phase shifters can be constructed using electronically tuned gratings as, for example, those formed by standing or traveling waves in acousto-optical Bragg cells and surface acoustic wave devices. Examples of such devices are shown in FIGS. 11–14. Any or all of the gratings in the triangle configuration may be replaced with acousto-optical gratings, as illustrated in FIG. 11. In this device the vertex grating 120 is driven to include twice the spatial frequency of the base gratings 121 and 122 with the inclusion of any phase shifts it is desired to impart. The drive electronics produces signal (sinusoidal) frequencies corresponding to the spatial frequency of the gratings, $F_b$ and $F_v$, with phase shift $\phi(t)$ applied. The drive frequency is related to the spatial frequency by the velocity of sound in the medium in the Bragg cells. In practice the base gratings may be tipped (as shown) to satisfy the Bragg condition for a middle wavelength, while the vertex grating is maintained Bragg-resonant with wavelength detuning. Either standing wave or traveling wave Bragg cells may be used. In the configuration illustrated in FIG. 11, the advancing phase shifts induced by traveling waves in the base gratings 121 and 122 are exactly cancelled by the retarding phase shifts of the vertex cell 120, leaving only the phase function $\phi(t)$ in the output wave.

Figure 12:
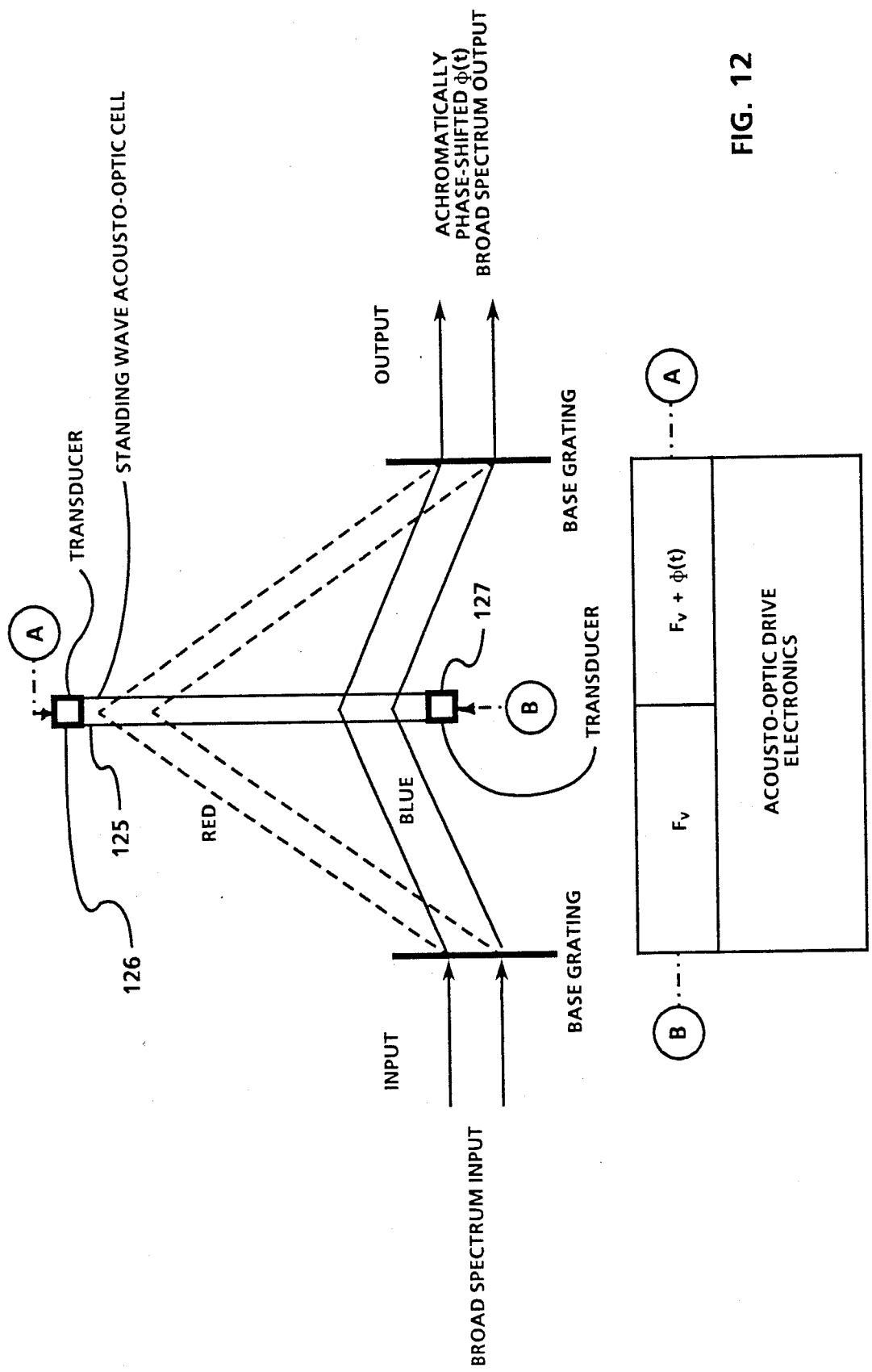
FIG. 12 is a schematic diagram of another triangular configuration utilizing a traveling wave acousto-optic cell for the apex diffraction element with means for driving the cell to obtain phase transformation in accordance with certain characteristics of the drive or modulating signals.

An electronically tunable achromatic phase shifter consisting of holographic base gratings 127 and 128 is illustrated in FIG. 12. In this device the vertex grating 125 is shown as a standing wave acousto-optical cell. Standing waves may be formed by reflection of the output of a single transducer 126 at the opposing cell boundary, or by the operation of two opposing transducers 126 and 127. In either case modulating the phase of the transducer drive signal will cause a grating shift and a corresponding achromatic phase shift on the diffracted light. The Bragg cell may also be operated in the traveling wave mode, in which case the grating is constantly in motion and phase modulation may readily be accomplished at rapid speeds.

Acousto-optic tuning may be accomplished in the imaged grating configuration, as illustrated in FIG. 13. In this device the acoustic Bragg cell 130 is inclined with respect to the incident beam to satisfy he Bragg condition for high efficiency. According to this condition the incident and diffracted angles at the middle wavelength of the white light input spectrum form equal angles with the grating modulation planes. The acoustic grating is then imaged onto a second grating 132 (which may be a volume holographic element) by one or more lenses 133 and 134 and the achromatically phase shifted output is obtained. Many imaging configurations in addition to the double-imaging case illustrated may be used.

Another electronically tunable achromatic phase shifter is illustrated in FIG. 14. In this device the close-cascade configuration is implemented with one or two Bragg cells 140 and 141. One feature of this implementation is that traveling wave cells may be used and still (constant) or slowly varying achromatic phase shifts may be obtained. If the transducers are mounted on the same side of the cells as illustrated in FIG. 14 the induced phase shits are in opposite directions. Thus, if the two transducer frequencies are the same, no time varying phase shift will result. This permits slowly varying phase changes to be impressed on any of the transducers with corresponding phase shift imparted to the optical waves. Similarly the transducers may be mounted at opposite ends of neighboring cells, with the result that the phase shifts imparted by each of the traveling gratings add, resulting in very rapid phase modulation.

Variations and modifications of the herein described phase shifters and systems in accordance with the invention using a diffractive grating displaced in a direction perpendicular to its rulings to shift the phase of diffracted light achromatically in proportion to the frequency of the grating and displacement will undoubtedly become apparent to those skilled in the art. Diffractive elements with more complex structures can be used to impart correspondingly more complex phase shifts. For example consider the translation of a chirped grating. Such a grating has a spatial period that is spatially varying, and substitution of this diffracting structure in the previously discussed devices can result in an achromatic phase shift which is spatially dependent. This type of device may be useful, for example, in white light shearing interferometry. Accordingly, the foregoing description should be taken as illustrative and not in a limiting sense.

We claim:

1. An optical system for processing light having a broad spectrum of wavelengths in which the optical phase of the light is changed achromatically which comprises a diffraction element on which a beam of input waves of said light is incident and from which diffracted light exits, displacement providing means for displacing said diffraction element transversely to said beam of input waves, and means for providing an output beam of said diffracted light in which the spatial form of the input waves is not substantially disturbed in response to a displacement of said element in a direction transverse to said beam of input waves to change the phase of said diffracted light achromatically.

2. The system according to claim 1 wherein said diffraction element is a grating which has lines, said lines being spaced to define the frequency of said grating, and said displacement providing means includes means for displacing said grating in a direction perpendicular to said lines for shifting the phase of said diffracted light achromatically in proportion to the frequency of said grating and the magnitude of said displacement.

3. The system according to claim 2 wherein said displacement providing means has means for providing a linear displacement of said element in said direction.

4. The system according to claim 3 wherein said displacement providing means has means for varying said displacement as a function of time to provide an achromatic frequency shift in said diffracted light.

5. The system according to claim 2 wherein said frequency of said grating varies spatially for providing spatially varying achromatic frequency shift resulting from said displacement.

6. The system according to claim 1 wherein a plurality of said diffraction elements are provided, at least one of which is disposed to spatially recombine the spectral components of said diffracted light, and wherein said displacement providing means is coupled to at least one of said elements for providing for the displacement thereof.

7. The system according to claim 6 wherein said plurality of elements includes an element on which said diffracted light is incident at a first angle, said element upon which said diffracted light is incident having a spatial period different from that of another said plurality of elements from which said light exits.

8. The system according to claim 6 wherein said plurality of elements include at least three diffraction elements disposed in a triangular configuration.

9. The system according to claim 8 wherein first and second of said plurality of elements define the base of said triangular configuration and a third of said plurality of elements define the vertex of said triangular configuration, said first and second elements being transmission gratings disposed symmetrically with respect to said third grating said third grating having a dispersive angle of incidence which is coupled to the wavelengths of the diffracted light from said first grating for diffracting and spatially recombining said light from said first grating to be incident upon said second grating, said second grating having an angle of dispersion for recombining spatially the light incident thereon.

10. The system according to claim 9 wherein said displacement providing means is coupled to said third grating, and said first and second gratings are stationary.

11. The system according to claim 10 further comprising interferometer means responsive to phase shifts between the light incident on said first grating and the light from said second grating, and means for providing a closed loop coupling such displacement providing means and said interferometer.

12. The system according to claim 9 where in said third grating has a spatial period $d_v$ and said first and second gratings have a spatial period $d_b$, and $d_b = 2d_v$.

13. The system according to claim 9 wherein said displacement providing means is connected to at least one of said first and second gratings and to said third grating for displacing them along an x direction lying in the plane of the gratings in the same ($+x$ or $-x$) direction and in opposite directions (one $+x$ and the other $-x$).

14. The system according to claim 9 wherein said third grating has a dispersive angle of incidence for diffracted light of symmetric $+1$ and $-1$ diffracted orders from said first grating for recombining said diffracted orders at said second grating.

15. The system according to claim 9 wherein fourth and fifth gratings are provided, said fourth and fifth gratings being in the same plane as said first and second gratings, respectively, and being displaced from said first and second gratings to define with said third grating another triangular configuration, and means for directing separate beams to be incident upon said first and fourth gratings.

16. The system according to claim 9 wherein at least one of said third gratings is an acousto-optic grating selected from the group consisting of a Bragg cell and a surface acoustic wave device.

17. The system according to claim 16 wherein all of said gratings are acousto-optic gratings having transducers and driving means and means for driving the transducer of said third grating with a signal of such frequency as to achieve twice the spatial frequency in the third grating as that achieved in the first and second of said gratings.

18. The system according to claim 6 wherein said plurality of elements include at least two diffraction elements disposed in close-cascade configuration.

19. The system according to claim 18 wherein a member defining a plurality of separate light paths parallel to the regions in said elements which define the spatial period thereof is disposed between said elements.

20. The system according to claim 18 wherein said elements are acousto-optic gratings each as defined in claim 1, wherein said phase shifting means is operative to shift the phase of the signal applied only to the transducer of one of said gratings.

21. The system according to claim 6 wherein said plurality of diffraction elements include first and second elements, and means for imaging said diffracted light from said first element upon said second element.

22. The system according to claim 21 wherein said imaging means includes at least one achromat lens having a focal length and disposed at an integral number of its said focal length from said first and second elements.

23. The system according to claim 21 wherein said imaging means includes first and second achromat lenses, said first lens each having a focal length, said first lens being spaced at its focal length or an even integral multiple thereof from said first element, said first and second lenses being spaced from each other by the sum of their focal lengths or even integral multiples of said sum thereof and said second element being spaced by the focal length of said second lens or an even integral multiple thereof from said second element.

24. The system according to claim 23 wherein said first element is an acousto-optic grating provided by a medium having transducers at opposite ends thereof, means for applying signals of like frequency to said transducers to establish the grating period therein, and means for shifting some of said signals in phase relative to the other to displace said grating.

25. The system according to claim 6 wherein said diffraction elements are volume transmission holographic elements.

26. The system according to claim 25 wherein said elements are disposed successively in the path of said incident beams and said diffracted light.

27. The system according to claim 6 wherein at least one of said plurality of elements is an acousto-optic grating.

28. The system according to claim 27 wherein said grating has a transducer coupled to said grating, and means for driving said transducer with a signal having a predetermined frequency and with a predetermined phase shift to define the spatial period of said grating, said means providing for the displacement of said grating being provided by means for shifting said signal in phase.

29. The system according to claim 28 wherein said grating has said transducer at one end and another transducer at the opposite end thereof, said phase shifting means being operative to shift the phase of the signal applied only to one of said transducers.

30. The system according to claim 6 wherein said plurality of diffraction elements are a plurality of gratings and include a first grating upon which an input beam of broad spectrum light is incident, a second grating in cascade with said first grating and having a dispersive angle of incidence for diffracted light of symmetric +1 and −1 diffracted orders, and third and fourth gratings in cascade with said second grating, means for directing light of said +1 diffracted order which is diffracted by said second grating to said third grating, and means for directing light of said −1 diffracted order which is diffracted by said second grating to said fourth grating whereby said third and fourth gratings provide phase shifts in the output light therefrom which are respectively relatively advanced and retarded with respect to said input light as said second grating is moved, relatively retarded in phase when said third and fourth gratings move away from each other and relatively advanced in phase when said third and fourth gratings move toward each other.

31. The system according to claim 30 further comprising means for retroreflecting output light from said third and fourth gratings, and means in the path of said incident light to said first grating for combining and processing said light which is retroreflected from said third and fourth gratings and is diffracted in said second and first gratings.

32. The system according to claim 6 wherein an achromatic phase shifter is provided having said plurality of elements and said displacement providing means, and further comprising means for directing a beam of input white light into said phase shifter, means that the output of said phase shifter for retroreflecting said light back through said phase shifter, Fourier transform means and light detection means in the path of said light which is retroreflected through said phase shifter for processing said retroflected light, said light detecting means being operative for detecting the light process in said transform means, and means for operating said displacement providing means for shifting the processing of said light between sine transform and cosine transform regimes.

33. The system according to claim 6 further comprising a gradient index rod lens means between said diffraction elements, said array having conjugate imaging planes on opposite sides of said lens means, each of said elements being disposed in a different one of said planes.

34. The system according to claim 6 further comprising achromatic Fourier transform means having input and output planes, different ones of said diffraction elements being disposed separately in said planes, a mask containing an input function adjacent to the element in said input plane, and means responsive to the light transmitted through said element in said output plane, said system providing a Fourier processor.

35. The system according to claim 6 wherein said plurality of elements are gratings disposed along first and second paths, a first of such gratings being common to both of said paths for directing light of different diffraction orders along said first and second paths, said first grating being disposed along said first path, at least a pair of gratings in cascade with said first grating along said second path, means for combining in interferring relationship light after passage through all of the gratings along said first path and all of the gratings along said second path.

36. The system according to claim 1 further comprising interferometer means responsive to the incident and phase changed light for providing an output signal, and means for operating said displacement providing means in accordance with said output signal.

* * * * *

UNITED STATES PATENT AND TRADEMARK OFFICE
CERTIFICATE OF CORRECTION

PATENT NO. : 4,786,124
DATED : 11/22/88
INVENTOR(S) : Thomas W. Stone and Nicholas George It is certified that error appears in the above-identified patent and that said Letters Patent is hereby corrected as shown below:

Replace the first paragraph in column 1 of the above-identified patent with the following paragraph.

-- This invention was made with Government support under one or more of the following contracts: ARO Contract Nos. DAAG29-83-K-0166 (Automatic Pattern Recognition) and DAAL03-86-K-0173 (URI Center for Opto-Electronic Systems Research). The Government has certain rights in this invention. --

Signed and Sealed this

Twenty-sixth Day of December, 1989

*Attest:*

JEFFREY M. SAMUELS

*Attesting Officer*   *Acting Commissioner of Patents and Trademarks*